(12) United States Patent
Watanabe et al.

(10) Patent No.: US 6,172,859 B1
(45) Date of Patent: Jan. 9, 2001

(54) MAGNETORESISTIVE HEAD AND MAGNETIC DISK APPARATUS

(75) Inventors: Katsuro Watanabe, Hitachi; Takashi Kawabe, Odawara; Shigeru Tadokoro, Odawara; Hiroshi Kamio, Odawara; Takao Imagawa, Mito, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 08/683,978

(22) Filed: Jul. 22, 1996

(30) Foreign Application Priority Data

Jul. 25, 1995 (JP) .................................................. 7-188812
May 31, 1996 (JP) .................................................. 8-137963

(51) Int. Cl.[7] ...................................................... G11B 5/39
(52) U.S. Cl. ......................................................... 360/327.3
(58) Field of Search ................................... 360/113, 126, 360/327.1, 327.3, 327.31, 327.32, 327.33; 428/692; 324/252; 338/32 R; 365/158

(56) References Cited

U.S. PATENT DOCUMENTS

| 4,639,806 | * | 1/1987 | Kira et al. ............................. 360/113 |
| 4,782,413 | * | 11/1988 | Howard et al. ....................... 360/113 |
| 4,841,399 | * | 6/1989 | Kitada et al. ......................... 360/113 |
| 4,916,563 | * | 4/1990 | Kawase ................................. 360/119 |
| 5,285,339 | * | 2/1994 | Chen et al. ........................... 360/113 |
| 5,315,468 | * | 5/1994 | Lin et al. .............................. 360/113 |
| 5,325,253 | * | 6/1994 | Chen et al. ........................... 360/113 |
| 5,434,826 | * | 7/1995 | Ravipati et al. ...................... 360/113 |
| 5,436,777 | * | 7/1995 | Soeya et al. .......................... 360/113 |
| 5,461,527 | * | 10/1995 | Akiyama et al. ..................... 360/113 |
| 5,549,978 | * | 8/1996 | Iwasaki et al. ....................... 428/692 |
| 5,664,316 | * | 9/1997 | Chen et al. ........................ 29/603.08 |
| 5,668,523 | * | 9/1997 | Chen et al. ........................... 360/113 |

* cited by examiner

Primary Examiner—David L. Ometz
(74) Attorney, Agent, or Firm—Antonelli, Terry, Stout & Kraus, LLP

(57) ABSTRACT

A magnetoresistive head in which Barkhausen noise is substantially suppressed and a variation in reproduction is minimized, and a magnetic disk apparatus using the same magnetic head have been provided. The feature of the magnetic head and the magnetic disk apparatus of the invention resides in the provision of the longitudinal bias layer which comprises a hard magnetic thin film formed on an underlayer made of either of a ferromagnetic thin film having a body-centered cubic lattice crystal structure formed of body-centered cells, an amorphous ferromagnetic thin film or antiferromagnetic thin film having a body-centered cubic lattice crystal structure formed of body-centered cells.

21 Claims, 14 Drawing Sheets

MAGNETORESISTIVE HEAD AND MAGNETIC DISK APPARATUS

BACKGROUND OF THE INVENTION

The present invention relates to a magnetic disk apparatus, and in particular, to a magnetoresistive head for use in reproducing magnetically recorded information.

With advancement of more compact and high-density magnetic disk apparatus, a magnetoresistive head (MR head) which is capable of producing a high reproducing output voltage irrespective of a relative speed between the disk and head has been put to actual use. An MR head presently in use mounted on magnetic disk apparatus utilizes anisotropic magnetoresistance effect in which its electric resistance changes depending on a relative angle formed between the direction of magnetization in a magnetic film and the direction of a signal detection current flow. Efforts to enhance its performance are being made through improvements of head structures and thin film materials. When a high surface recording density as high as several $Gb/in^2$ is required, it is anticipated for any MR head which utilizes the anisotropic magnetoresistance effect that there will occur a decrease in sensitivity, therefore, R&Ds of a new head utilizing a macromagnetoresistance effect are under way in which its electrical resistance is caused to change responsive to a relative angle to be formed between respective directions of magnetization in two magnetic thin films which are laminated with a non-magnetic conductive thin film interposed therebetween. In any types of MR heads above, changes of electrical resistance take place due to rotation of magnetization in the magnetoresistance film, therefore, in order to obtain a noise-free reproducing waveform, movement of domain walls must be suppressed as much as possible.

As means for suppressing Barkhausen noise due to movement of the domain walls, a laminated structure of prior art is disclosed in U.S. Pat. No. 5,018,037 in which a hard magnetic thin film is laminated on the magnetoresistance film via a non-magnetic thin film, and other structures are disclosed in U.S. Pat. Nos. 5,018,037 and 5,079,035 in which hard magnetic thin films are disposed abutting the magnetoresistance film on both sides thereof.

For any hard magnetic thin film to be used in the magnetoresistance head, there are required two fundamental magnetic properties in order to prevent Barkhausen noise. One is that it must have a large coercive force. Namely, since the MR head is applied a signal as a magnetic field from a recorded medium and also subjected to a recording magnetic field from the recording head, thus, in order to ensure a stable reproducing characteristic to be maintained even when such external magnetic fields are applied, a coercive force of a sufficient magnitude is required so that a longitudinal bias magnetic field impressed from the hard magnetic thin film to the magnetoresistance film will not change easily. The other requirement is that an in-plane component of magnetization should be large enough, that is, squareness of a magnetization loop measured by applying a magnetic field along an intraplane direction should be large. Since it is the in-plane component among magnetization components by the hard magnetic thin film that plays a major role to act effectively as the longitudinal bias magnetic field, it is necessary for this in-plane component to be substantially large as well as for the squareness of its magnetization loop to be substantially large so that the longitudinal bias magnetic field will remain invariant even if external magnetic fields are applied.

FIG. 15 is a schematic diagram indicative of the structure of a prior art MR head disclosed in U.S. Pat. No. 5,005,096. This prior art MR head is directed to suppressing Barkhausen noise in magnetoresistive effect layer 15 by impressing a magnetic field produced by hard magnetic thin film 26 which is formed on non-magnetic underlayer 251 made of Cr or the like. Although it is possible to obtain hard magnetic thin film 26 which has a large coercive force and a large squareness through the provision of non-magnetic underlayer 251, since a portion of the magnetic field derived from hard magnetic thin film 26 is caused to recirculate through an MR element including soft magnetic thin film 13, non-magnetic conductive thin film 14 and magnetoresistive effect film 15, directions of magnetization in magnetoresistive effect film 15 become opposite between the sense area and both sides thereof as indicated in FIG. 15. Therefore, the state of magnetization in magnetoresistive effect film 15 becomes very unstable, thereby it becomes difficult to suppress Barkhausen noise.

FIG. 16 depicts the structure of an MR element disclosed in U.S. Pat. Nos. 5,018,037 and 5,079,035, in which on the both sides of the MR element a hard magnetic thin film is formed in order to eliminate a region having a magnetization component the direction of which is opposite within the magnetoresistive effect film such that the magnetization due to the hard magnetic thin film is effected to act only on a unilateral direction. This structure of laminated films including soft magnetic thin film 13, non-magnetic conductive thin film 14 and magnetoresistive effect film 15 (hereinafter referred to as soft magnetic thin film/non-magnetic conductive thin film/magnetoresistive effect film) is formed by the steps of etching other regions except for the sense area, forming hard magnetic thin films 26 on the both sides of the sense area, and forming electrodes on hard magnetic thin films 26.

Then, a further etching becomes necessary to etch the sides of the lamination of the soft magnetic thin film/non-magnetic conductive thin film/magnetoresistive effect film to form a gradual inclination so as to maintain a predetermined magnetic coupling and electrical contact between the soft magnetic thin film/non-magnetic conductive thin film/magnetoresistive effect film and the hard magnetic thin film 26 and also the electrode, thereby, a portion of hard magnetic thin film 26 is formed along the gradual inclination of the soft magnetic thin film/non-magnetic conductive thin film/magnetoresistive effect film. However, there is a problem associated with this prior art that since soft magnetic thin film 13 or magnetoresistive effect film 15 normally has a crystal structure of a face-centered cubic lattice, a portion of the hard magnetic thin film which is formed on such crystal structure tends to deteriorate its property greatly, in particular, its coercive force compared to that in other portion thereof.

Further, there is another problem associated with the prior art which generally uses Co—Cr—Pt hard magnetic thin film or Co—Cr hard magnetic thin film as hard magnetic thin film 26 that it is difficult to obtain an in-plane component of magnetization or a squareness which is sufficiently large on other areas excepting areas of soft magnetic thin film 13 or magnetoresistive effect film 15. Thin films generally have a tendency that the most dense crystal plane tends to grow parallel to the film surface thereof, thereby, in the case of the hard magnetic thin film of the prior art, plane (001) is likely to be oriented parallel to the film surface. On the other hand, since an easier magnetization direction is in the direction of <001>, magnetization tends to be directed perpendicular to the film plane, which causes the in-plane component which responds most effectively to the longitudinal bias magnetic field to decrease.

These problems associated with the prior art can be solved by providing an appropriate underlayer and forming a hard magnetic thin film thereon. According to current studies on magnetic recording medium, the provision of non-magnetic backing layers made of Cr or the like is known to be effective. However, the non-magnetic underlayer provided under the hard magnetic thin film for use in the MR head will interrupt a magnetically exchange coupling between hard magnetic thin film 26 and soft magnetic thin film 13 as well as magnetoresistive effect film 15, thereby, a desired effect to stabilize magnetization in the side regions of soft magnetic thin film 13 and magnetoresistive effect film 15 cannot be attained. Thereby, magnetization in these ferromagnetic thin films become unstable, thereby causing a Barkhausen noise and a variation in reproducing characteristics to occur readily.

Now, the problems associated with the prior art MR head using anisotropic magnetoresistive effect have been described hereinabove. However, the same problems will take place with an MR head which uses a macro magnetoresistive effect since its MR element is composed of a ferromagnetic thin film having a crystal structure of a face-centered cubic lattice.

SUMMARY OF THE INVENTION

An object of the present invention is to provide a magnetoresistive head and a magnetic disk apparatus using the same, which has an improved coercive force and improved hysteresis loop squareness for its hard magnetic thin film thereby capable of preventing the coercive force of the hard magnetic thin film from decreasing even if disposed on the ferromagnetic thin film having a crystal structure of face-centered cubic lattice, and which is free from Barkhausen noise and has a stable reproducing property, which have been realized by maintaining a magnetic exchange coupling between the hard magnetic thin film and a ferromagnetic thin film constituting the MR element.

The above-mentioned object of the invention can be accomplished by providing a magnetic head of a magnetoresistive effect type having a magnetoresistive film which translates a magnetic signal to an electric signal by means of magenetoresistive effect, a pair of electrodes for supplying a signal detection current to the magnetoresistive effect film, and a longitudinal bias layer for applying a longitudinal bias magnetic field to the magnetoresistive effect film, wherein said longitudinal bias layer comprises a underlayer made of a ferromagnetic thin film and a hard magnetic thin film formed thereon.

By way of example, any ferromagnetic thin film having a crystal structure of a body-centered cubic lattice which is formed of body-centered cells or an amorphous ferromagnetic thin film can be utilized as the underlayer comprised of the ferromagnetic thin film. Further, the above-mentioned object of the invention can be attained also by use of an underlayer comprising an antiferromagnetic thin film having a crystal structure of a body-centered cubic lattice which is formed of body-centered cells instead of the underlayer comprising the ferromagnetic thin film.

In the case where the magnetoresistive effect film uses a material which exhibits anisotropy in its magnetoresistive effect, it is necessary to provide means for applying a transverse bias field to the magnetoresistive effect film. A typical method of applying such a bias is implemented through a soft magnetic thin film which is provided abutting the magnetoresistive effect film via a non-magnetic conductive thin film.

Further, the magnetoresistive effect film of the invention may include a lamination structure comprising a first magnetic thin film, a second magnetic thin film and a non-magnetic conductive thin film which is interposed therebetween, wherein the direction of magnetization of said first magnetic thin film is fixed by an antiferromagnetic layer which is provided abutting the first magnetic thin film, and the direction of magnetization of said second magnetic thin film is substantially perpendicular to the direction of magnetization of said first magnetic thin film under presence of no external magnetic field, and wherein the electrical resistance of the magnetoresistive laminated film changes according to a relative angle between the direction of magnetization in said first magnetic thin film and the direction of magnetization in said second magnetic thin film. Materials used as the hard magnetic thin film of the invention includes an alloy having Co and $M_1$ as main components (where $M_1$ is at least one element selected from the group of Cr, Ta, Ni, Pt and Re), or an alloy with addition of oxide having an alloy made of Co and $M_1$ and addition of $M_2$ (where $M_2$ is at least one oxide selected from the group of silicon oxide, zirconium oxide, aluminum oxide and tantalum oxide). Other typical examples of Co—Cr—Pt alloys include Co—Re alloy, Co—Cr alloy, Co—Ta—Cr alloy, Co—Ni—Pt alloy and the like.

Material used as a underlayer of the hard magnetic thin film which is a ferromagnetic thin film having a crystal structure of a body-centered cubic lattice includes Fe—Cr alloy, Fe, Fe—Ni alloy, Fe—Co alloy, Fe—Ni—Co alloy, or any alloy having one of the above-mentioned alloys with addition of $M_3$ (where $M_3$ is at least one element selected from the group of Si, V, Cr, Nb, Mo, Ta and W).

In the case of Fe—Ni alloy, Fe-0 to 25 at. % Ni is used. In the case of Fe—Co alloy, Fe-0 to 80 at. % Co is used. In the case of Fe—Ni—Co alloy, $Fe_{100-a-b}$—$Ni_a$—$Co_b$ (where $0 \leq a \leq 25$, $0 \leq b \leq 80$) is used. In the case where Fe and an alloy of Fe alloy with addition of any of the above-mentioned non-magnetic elements is used, it should be used as a ferromagnetic backing film in a range of component ratios that will ensure a stable body-centered cubic lattice structure and exhibit a ferromagnetism at temperatures about 100° C. at which the magnetic disk unit is used needs to be satisfied in order to be used. In the case of a combination of Fe and any of the above-mentioned additive elements, respective upper limits of addition of respective elements are 32 at % for Si, 48 at % for V and 45 at % for Cr, and 6 at % for Nb, Mo, Ta and W, respectively. Among these, in particular, Fe—Cr alloy is preferable in which 5 to 45 at % of Cr is preferred in view of a high corrosion resistance.

As a material to be used as the underlayer comprised of an amorphous ferromagnetic thin film, an amorphous alloy having as its main components Co and $M_5$ is utilized (where $M_5$ is at least one element selected from the group of Ti, V, Cr, Zr, Nb, Mo, Hf, Ta, Y, Ru, Rh, Cu, Ag, Au and Pt).

Further, as a material of the antiferromagnetic thin film having the crystal structure of body-centered cubic lattice, an alloy having as its main components Cr, Mn and $M_4$ is utilized (where $M_4$ is at least one element selected from the group of Cu, Au, Ag, Co, Ni and platinum metal).

Through use of the underlayer made of either a ferromagnetic thin film having a crystal structure of a body-centered cubic lattice, an amorphous ferromagnetic thin film or an antiferromagnetic thin film having a crystal structure of a body-centered cubic lattice, the following act can be produced advantageously according to the invention.

The coercive force and squareness of the hysteresis loop can be significantly improved since the direction of <001> of the hard magnetic thin film which corresponds to its easy magnetization direction is inclined from a direction perpendicular to the direction of the film plane toward a direction parallel to the film plane, or completely oriented to the direction of the film plane.

Further, when forming a hard magnetic thin film on a ferromagnetic thin film having a crystal structure of a body-centered cubic lattice, growth of any crystal grains having a face-centered cubic lattice having a small crystal magnetic anisotropy is suppressed within the hard magnetic thin film, thereby preventing a decrease of coercive force. As for the materials of the aforementioned hard magnetic thin film, there is known to exist such a crystal which has a face-centered cubic lattice and has a small crystal magnetic anisotropy other than crystals which have a closest packed hexagonal lattice having a large crystal magnetic anisotropy. When the layer on which the hard magnetic thin film is to be formed has a face-centered cubic lattice, crystal grains having a face-centered cubic lattice tend to be formed also in the hard magnetic thin film since its crystal structure is influenced. However, by use of the underlayer described above, decrease of coercive force can be prevented.

A hard magnetic film, even if it is formed on a layer having a different crystal structure, can produce a hard magnetic thin film having a uniform magnetic characteristic irrespective of a difference of bottom layers through the provision of the above-mentioned underlayer.

Further, through interaction due to a magnetic exchange coupling between the hard magnetic thin film and the ferromagnetic thin film which constitutes MR element, the direction of magnetization within the ferromagnetic thin film constituting the MR element can be fixed stably in the same direction as that of a longitudinal bias magnetic field which is produced from the hard magnetic thin film and enters a sense portion of the MR element.

The ferromagnetic thin film having a crystal structure of a body-centered cubic lattice which is used as the underlayer of the invention has a significant role to change crystal orientation in a hard magnetic thin film to be formed thereon and increase in-plane magnetization components in the direction parallel to the film plane. An alloy having Fe and Cr as its main components and having a body-centered cubic lattice crystal structure for use as the ferromagnetic thin film of the invention is adapted to have a stable face-centered cubic structure, and is formed into a ferromagnetic thin film having a body-centered cubic lattice by a known manufacturing method. Further, Fe—Cr alloy having a ratio of Cr from 5 to 45 atomic % provides a preferred underlayer of the invention since it has an anti-corrosion property suitable for practical application as well as it shows an excellent ferromagnetism at temperatures of about 100° C. which is ambient temperature to be subjected to during the operation of the magnetic disk equipment.

When a hard magnetic thin film is used as a longitudinal bias layer for applying a longitudinal bias to the magnetoresistive head, an intrinsic coercive force of the hard magnetic thin film must have a sufficiently large value compared to that of external magnetic field acting thereon. However, when a hard magnetic thin film is formed on the magnetoresistive effect film or on a Ni—Fe alloy thin film which is used as a soft magnetic thin film provided for applying a transverse bias field, its intrinsic coercive force decreases significantly compared to when it is formed on a glass substrate, thereby it cannot be used as the longitudinal bias layer. In order to prevent the intrinsic coercive force from decreasing, a method is adopted of laminating a hard magnetic thin film on a magnetoresistive effect film or a soft magnetic thin film via a non-magnetic layer. In this case, however, Barkhausen noise cannot be suppressed sufficiently. This is because that there exists a portion in the magnetoresistive effect film or in soft magnetic thin film which has magnetization the direction of which is opposite to the direction of magnetization of the hard magnetic thin film, thereby causing instability in the direction of magnetization or causing a magnetic domain wall. Thereby, if the direction of magnetization in the magnetoresistive effect film or the soft magnetic thin film is stabilized in the same direction as that of magnetization of the hard magnetic thin film, Barkhausen noise can be significantly suppressed.

In order to suppress a decrease in the intrinsic coercive force of the hard magnetic thin film and to stabilize the direction of magnetization in the magnetoresistive effect film or the soft magnetic thin film in the same direction as that of magnetization of the hard magnetic thin film, it is most effective to form a ferromagnetic thin film having a crystal structure of a body-centered cubic lattice as a underlayer, then form a hard magnetic thin film thereon. This step of providing a film having a crystal structure of a body-centered cubic lattice as the underlayer of the invention is directed to suppressing the growth of crystal grains having a face-centered cubic lattice the crystal magnetic anisotropy of which is substantially small, and to promoting the growth of a closest packed hexagonal lattice the crystal magnetic anisotropy of which is substantially large. Further, the provision of the underlayer which uses a ferromagnetic material produces an exchange coupling between the magnetoresistive effect film or the soft magnetic thin film and the hard magnetic thin film, thereby, the direction of magnetization is stabilized in the same direction. Through provision of such arrangement according to the invention, a combined act of the effect by the longitudinal bias magnetic field due to the hard magnetic thin film and the effect of stabilization of magnetization due to the exchange coupling produces an improved suppression effect to reduce Barkhausen noise. Conversely, due to an added act by the exchange coupling which promotes stabilization of magnetization, the same noise suppression effect can be attained using a hard magnetic thin film which has a smaller intrinsic coercive force, thereby broadening a scope of options available for the materials of the hard magnetic thin film and conditions for film manufacture, thereby facilitating manufacturing thereof. Further, since a magnitude of a magnetic field available through the exchange coupling between the magnetoresistive effect film or the soft magnetic thin film and the hard magnetic thin film will increase with a decreasing thickness of the ferromagnetic thin film interposed therebetween, a film thickness of the ferromagnetic thin film should be preferably as thin as possible. When a underlayer as thin as possible is used, a distance between the hard magnetic thin film and the magnetoresistive effect film or soft magnetic thin film becomes smaller than a distance from a shield film, thereby occurrence of such a problem can be eliminated that the magnetic field from the hard magnetic thin film is absorbed by the shield film thereby preventing a sufficient supply of the longitudinal bias magnetic field to the sense portion, consequently reducing the suppression effect to reduce Barkhausen noise.

The same effect and advantage can be obtained to suppress Barkhausen noise through use of an antiferromagnetic thin film having a crystal structure of a body-centered cubic lattice or an amorphous ferromagnetic thin film for the underlayer.

The magnitude of a longitudinal bias magnetic field, since it depends on an amount of magnetic flux from the ferromagnetic film which constitutes the longitudinal bias layer, is adjusted in general by changing a residual magnetic flux density and film thickness of the ferromagnetic film. As for the hard magnetic thin film having a underlayer, an actual effect is determined by a sum of a product between a residual flux density of the hard magnetic thin film and a thickness thereof, and a product between a residual flux density of the underlayer and a thickness thereof. In regard of controllability of longitudinal bias magnetic field, it is most easy to control the same when an antiferromagnetic thin film is used since magnetic flux from the underlayer will be eliminated. When the underlayer used is a ferromagnetic thin film, irrespective of whether its crystal structure is of a body-centered cubic lattice or amorphous, it is considered that the smaller the residual flux density, the easier to control by taking into account a variation in film thickness.

The feature of the invention resides in providing a magnetoresistive head having: a magnetoresistive effect element layer including a magnetoresistive effect film the electric resistance of which is changed by magnetic field, a lateral bias film for applying a transverse bias field to the magnetoresistive effect film, and a separation film interposed between the lateral bias film and the magnetoresistive effect film; a pair of longitudinal bias layers disposed on both sides of the magnetoresistive effect element layer abutting thereto for applying a longitudinal bias to themagnetoresistive effect film; and a pair of electrodes provided on a permanent magnet film for conducting a signal detection signal to the magnetoresistive effect film, wherein a thickness of the permanent magnet film is smaller than a thickness of the magnetoresistive effect element layer, and the longitudinal bias layer comprises the aforementioned arrangement.

Preferably, the aforementioned hard magnetic thin film is either a Co—Pt alloy, Co—Cr—Pt alloy, or its alloy with addition of at least one element selected from the group of titanium oxides, vanadium oxide, zirconium oxide, niobium oxide, molybdenum oxide, hafnium oxide, tantalum oxide, tungsten oxide, aluminum oxide, silicon oxide and chromium oxide.

This hard magnetic thin film of the invention preferably comprises compositions of formulas 1 or 2 as described below.

$$Co_a Cr_b Pt_c \quad \text{(eq. 1)}$$

or

$$(Co_a Cr_b Pt_c)_{1-x}(Mo_y)_x \quad \text{(eq. 2)}$$

where, x: 0.01 to 0.20, y: 0.4 to 3, a: 0.7 to 0.9, b: 0 to 0.15, c: 0.03 to 0.15, M: at least one of Ti, V, Zr, Mo, Hf, Ta, W, Al, Si and Cr.

A soft magnetic film for applying the transverse bias field to the magnetoresistive effect film is preferably a compound made of one of a Ni—Fe alloy, Co, Ni—Fe—Co alloy, and at least one or more elements selected from the group of zirconium oxide, aluminum oxide, hafnium oxide, titanium oxide, beryllium oxide, magnesium oxide, rare earth oxide compound, zirconium nitride, hafnium nitride, aluminum nitride, titanium nitride, beryllium nitride, magnesium nitride, silicon nitride and rare earth nitride compound.

Preferably, the soft magnetic thin film for applying transverse bias field to the magnetoresistive effect film has a resistivity of 70 μΩcm or more.

Preferably, the aforementioned lateral bias film is a Ni—Fe alloy which contains nickel from 78 to 84 atomic percentage.

The present invention is directed to providing the magnetoresistive head having a pair of longitudinal bias layers mounted on a substrate, a pair of electrodes formed thereon, and the magnetoresistive element layer provided between said pair of longitudinal bias layers abutting thereto, wherein said element layer comprises an antiferromagnetic film made of nickel oxide, two layers of ferromagnetic films, a non-magnetic metal film and a soft magnetic film, which are deposited on the substrate sequentially, and wherein the longitudinal bias layer comprises the aforementioned arrangement.

Preferably, said two layers of ferromagnetic films comprise a ferro-alloy layer containing Ni from 70 to 95 atomic percentage and a Co layer, which are deposited sequentially on the substrate.

Said two layers of ferromagnetic films preferably comprise a first soft magnetic film which is adjacent to the antiferromagnetic film and a second soft magnetic film which has a larger magnetoresistive change ratio than that of the first soft magnetic film.

This invention relates to a magnetoresistive head having a pair of longitudinal bias layers provided on a substrate, a pair of electrodes formed on the pair of said longitudinal bias layers, and a magnetoresistive effect element layer provided between and in contact with said pair of longitudinal bias layers which are permanent magnets, wherein said element layer comprises an antiferromagnetic film, a ferromagnetic film, a non-magnetic film, a soft magnetic film, a non-magnetic film, a ferromagnetic film and an antiferromagnetic film, each film being deposited sequentially from the side of said substrate.

As to a quantity of each compound to be included in said longitudinal bias film and lateral bias film for use in the magnetoresistive head of the invention, each atomic percentage except for oxygen or nitrogen in each compound is preferably from 3 to 20% relative to a total atomic percentage except for oxygen and nitrogen. This is because that when a quantity of a compound is less than 3%, its electrical resistance is too small, and when it is more than 20%, its saturated magnetic flux density decreases so much as to be insufficient for a bias film. Resistivity of a bias film according to the invention increases substantially in proportion to a quantity of addition of compounds, however, it is preferable for a magnetoresistive head to have a resistivity of 70 μΩcm or more. This is due to an observation that an output of the magnetoresistive head will decrease unless the resistivity of the bias film is sufficiently greater than the resistivity of the magnetoresistive effect film. Since the resistivity of the magnetoresistive effect film is normally from 20 to 30 μΩcm, thereby at least twice of that value is preferred as a guideline for the resistivity of the bias film.

The bias film of the invention can be formed either by vapor deposition, sputtering, ion sputtering or the like. A target of sputtering or ion sputtering may be provided by the steps of mixing a powder of an alloy made of Ni, Fe, Co and the like with a powder of a compound, sintering and molding the mixed powder. Alternatively, it may be obtained as well by disposing a chip of compound on a metal target comprised of Ni, Fe, Co or the like, thereby, through use of such a target, an alloy comprised of Ni, Fe, Co or the like and a compound can be deposited simultaneously. Further, the bias film of the invention can be manufactured by disposing a metal target comprised of Ni, Fe, Co or the like, and a compound target within sputtering equipment such that each particle emitted from the targets is substantially mixed on the substrate as described above.

As an antiferromagnetic film, a nickel oxide, Fe—Mn alloy thin film, Cr—Mn alloy, Cr—Al alloy film or the like is used.

The hard magnetic film according to the invention has a resistance to an external magnetic field such that its direction of magnetization will hardly change, for example, assuming its coercive force being 100 oersted or more, its direction of magnetization will not change substantially even if applied with an external magnetic field of 50 ousted, thereby indicating the same effect as by an antiferromagnetic film. Namely, since the hard magnetic film of the invention has a property to be able to impress a unilateral anisotropy through a bias exchange coupling to another magnetic film formed in the proximity thereof, thereby effectively producing a longitudinal bias magnetic field in the magnetoresistive effect film abutting thereto.

As the aforementioned soft magnetic film, it is preferable to use an alloy including Ni from 70 to 95 atomic percentage and Fe from 5 to 30 atomic percentage, or an alloy of the foregoing with addition of Co from 1 to 5 atomic percentage, or an alloy having a face-centered cubic lattice structure including Co from 30 to 85 atomic percentage, Ni from 2 to 30 atomic percentage and Fe from 2 to 50 atomic percentage. In addition, other alloys such as Permalloy, Perminvar or the like may be used likewise. Namely, it is preferable to use a material which is ferromagnetic and has an improved soft magnetic characteristic since such material will facilitate manufacturing of a desirable lamination structure, provide an improved soft magnetism characteristic, and an improved magnetoresistive effect.

As the aforementioned non-magnetic conductive film, it is preferable to use Au, Ag, Cu, otherwise, Cr, Pt, Pd, Ru, Rh etc., or their alloy. That is, it is desirable to use a material that will not be self-magnetized at room temperatures, and has a good electron transmissivity.

It is possible also to use a very thin non-magnetic insulating film instead of the non-magnetic conductive film. That is, since any type of film may be used so long as it allows movement of electrons between magnetic thin films, a tunnel effect film, for example, may be used as well. In this case, it is necessary for the non-magnetic insulating film to be formed thin enough to ensure tunneling of electrons therethrough, preferably less than 100 Å in general, and more practically less than 50 Å. As a method of providing the aforementioned non-magnetic separation film, it is preferable to use an oxide film on the surface of the soft magnetic film, or a metal film separately formed on the soft magnetic film, which metal film may be, for example, an oxide film on the surface of aluminum. Further, aluminum oxide film or the like may be used as well. That is, it is desirable to use a material which has a property to cut off magnetic coupling between magnetic films.

Further, the aforementioned substrate which serves as a base to form these films thereon may have a function as a slider for mounting the magnetic disk equipment, thereby, it is preferable for this substrate to be comprised of sintered ceramics of alumina containing TiC 5% or less, stabilized zirconium or the like.

Through the provision of such film structure, the magnetoresistive effect element of the invention is provided with a property such that its electrical resistance is allowed to change significantly in a range from 5 to 10% when subjected to a weak external magnetic field. Therefore, the magnetic disk apparatus according to the invention can have a function to transduce a recorded signal recorded in analog state directly to a digital signal during its reproduction step, and have an improved recording capacity per disk area, namely, an increased recording density.

Further, as for the film construction, it may be comprised by forming a planar film of such as aluminum oxide, nickel oxide or the like on the substrate, or forming on the substrate further a underlayer such as Fe, Ti, Ta, Zr, Hf, Nb, Co—Fe alloy. It is desirable for the films to be formed on the substrate to allow a multi-layered film to be formed evenly on the surface thereof, and provide a homogeneous and planar film structure on the surface of the substrate. Each film made of a metal preferably has a thickness from 20 to 200 Å, and each film made of other than metals preferably has a thickness from 5 to 100 Å.

A thin film magnetic head according to the invention combines features of an inductive type recording head for recording a signal in a recording medium and a magnetoresistive effect type reproduction head for reproducing the signal thus recorded, wherein the reproduction head comprises a sandwich structure of two magnetic films with a non-magnetic conductive film interposed between the two magnetic films, and said recording head is formed between said substrate and said reproduction head.

According to the invention, it is possible to reduce deterioration of sensitivity in the magnetoresistive effect element resulting from an increasing shape anisotropy in its magnetic film. This deterioration can be reduced by forming a thinner magnetic film since the magnitude of the shape anisotropy of the magnetic film is approximately proportional to its thickness. On the other hand, a total thickness from 100 to 300 Å is required for the magnetoresistive film in order to prevent a fall of output due to surface scattering. However, a thickness of each film separated by the non-magnetic film, in particular, that of the soft magnetic film in the center of film lamination may be less than 100 Å or even from 10 to 20 Å since no loss occurs in the output. This is due to the fact that an effectuating mechanism of the magnetoresistance effect resides in an interface of its magnetic film/non-magnetic film/magnetic film.

Further, a thickness of the magnetic film in the magnetoresistive effect element of the invention is preferably from 5 to 100 Å and, in particular, from 10 to 100 Å in order for the magnetic film to have a sufficient magnetization at room temperatures, and to make the most use of a current for achieving the magnetoresistive effect.

It is desirable for the non-magnetic conductive film for separating each magnetic film to have a thickness from 2 to 1000 Å. This thickness of the non-magnetic conductive film is necessary to ensure that conduction of electrons is not prevented therethrough and an antiferromagnetic or ferromagnetic coupling between the magnetic films is maintained sufficiently small, thereby, a particular thickness preferred for Cu, for example, is from 10 to 30 Å.

An example of appropriate structures of magnetoresistive elements of the invention is comprised of thin films of NiO, NiFe, Cu, NiFe, Cu, NiFe, NiO sequentially laminated on the substrate in the order as recited above, and a pair of electrodes disposed on the top thereof. Alternatively, it is comprised of thin films of NiO, Co/;NiFe, Cu, CoNiFe, Cu, Co/NiFe, NiO sequentially laminated on the substrate in the order as recited, and a pair of electrodes disposed on the top thereof.

Alternatively, a magnetoresistive effect element of the invention comprises films of NiO, Co—Ni—Fe, Cu, Ni—Fe, Cu, Co/Ni—Fe, NiO sequentially laminated on a substrate, and a pair of electrodes disposed on the top thereof. These arrangements of the invention are advantageous in that it can very effectively prevent a decrease of the output due to surface scattering, can improve an effective output and reduce the thickness of a film in the center of lamination so that deterioration of sensitivity of the element due to shape anisotropy in the magnetic film can be prevented without lowering the output.

The magnetic disk apparatus of the invention includes the magetoresistive effect element described above in its reproduction unit, and thus has advantages that a substantially improved recording density can be implemented since its recording wavelength to record information on the recording medium can be shortened, and that a very thin track width of recording with a sufficient reproduction output and a stable recording quality can be realized.

BRIEF DESCRIPTION OF THE DRAWINGS

Other features and advantages of the invention will be apparent from the following description taken in connection with the accompanying drawings wherein.

DESCRIPTION OF REFERENCE NUMERALS

10 . . . non-magnetic substrate, 13 . . . soft magnetic thin film, 14 . . . spacer film, 33, 43, 56 . . . non-magnetic conductive thin films, 15 . . . magnetoresistive film, 17 . . . electrode, 18, 20 . . . insulating films, 21 . . . second ferromagnetic film, 22 . . . soft magnetic film, 24 . . . longitudinal bias layer, 26 . . . hard magnetic thin film, 27, 28 . . . antiferromagnetic film, 31 . . . antiferromagnetic layer, 32, 34 . . . magnetic film, 35 . . . protection film, 36 . . . track width direction, 45 . . . first ferromagnetic film, 51 . . . magnetization in soft magnetic thin film, 52 . . . magnetization in magnetoresistive effect film, 53 . . . magnetization in hard magnetic thin film, 54 . . . 80 at. % Ni—Fe alloy film, 60 . . . magnetoresistive element, 83 . . . upper magnetic film, 84 . . . lower magnetic film, 85 . . . coil conductor, 90 . . . head slider, 91 . . . recording medium, 92 . . . actuator, 93 . . . spindle motor, 94 . . . signal processing circuit, 100 . . . magnetization sensing area, 111 . . . lower shielding layer, 112 . . . upper shielding layer, 121 . . . lower gap layer, 122 . . . upper gap layer, 201 . . . base, 202 . . . spindle, 203 . . . motor, 204a, 204b, 204c, 204d, 204e . . . magnetic disks, 205a, 205b, 205c, 205d, 205e . . . magnetic heads, 206 . . . carriage, 207 . . . voice coil, 208 . . . magnet, 209 . . . control circuit of voice coil motor, 210 . . . write/read circuit, 211 . . . interface, 212 . . . upper level unit, 213 . . . voice coil motor, 251 . . . non-magnetic underlayer, 252 . . . ferromagnetic underlayer.

PREFERRED EMBODIMENTS

Embodiment 1

Figure 2:
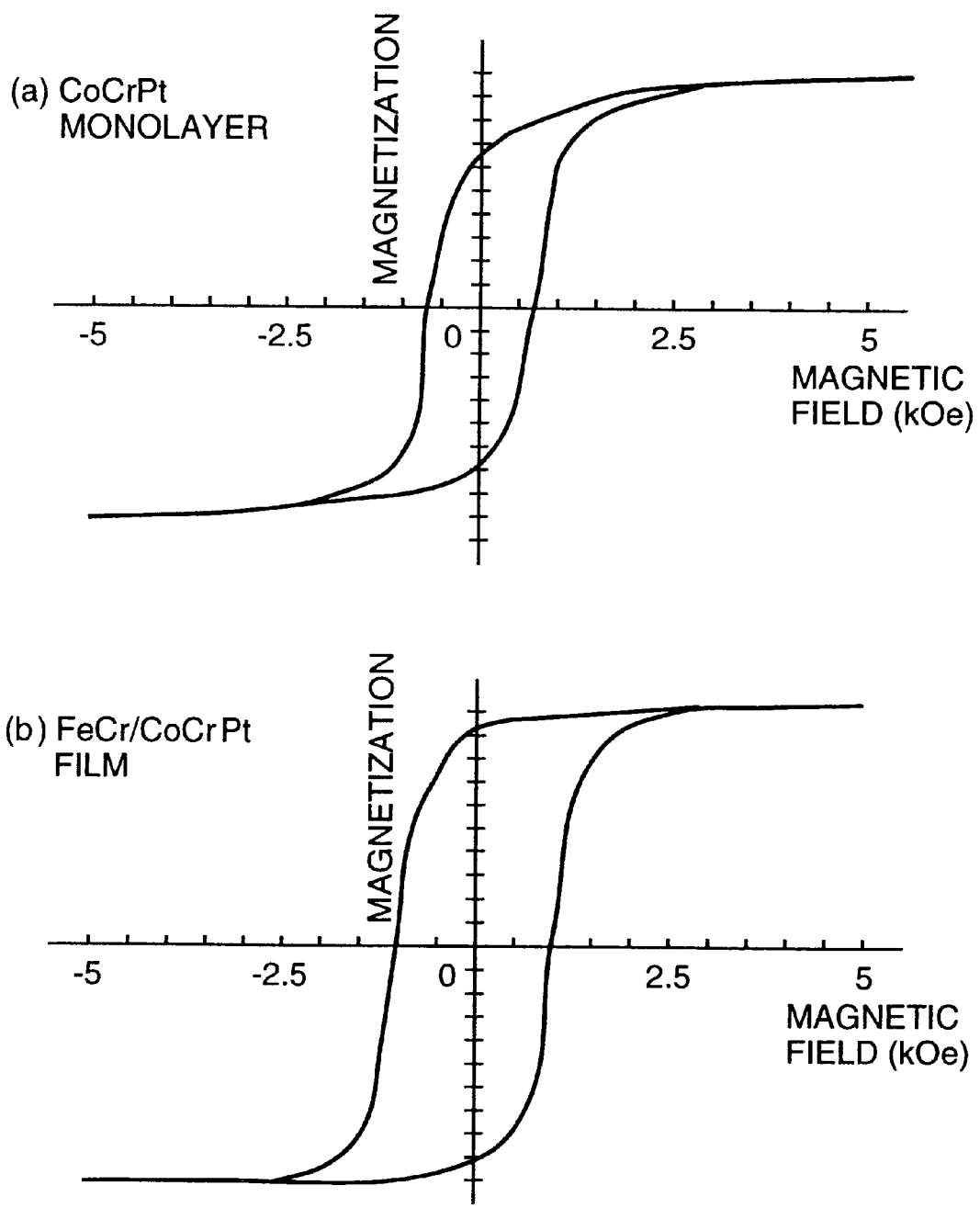
FIG. 2 is a diagram for comparison of magnetic characteristics between a prior art monolayer hard magnetic film and a hard magnetic film of the invention having a ferromagnetic thin film having a body-centered cubic structure as an underlayer.

An improvement in magnetic characteristics of a hard magnetic thin film which is formed on a underlayer and which uses a underlayer of an Fe—Cr alloy thin film having a crystal structure of a body-centered cubic lattice according to the invention will be described in the following. FIGS. 2(a) and (b) compare magnetic characteristics in intrafilm directions between a monolayer of a prior art Co—Cr—Pt hard magnetic thin film (FIG. 2(a)) and a hard magnetic thin film of Co—Cr—Pt alloy formed on an Fe—Cr alloy thin film (hereinafter referred to as Fe—Cr/Co—Cr—Pt) according to the invention (FIG. 2(b)). Thin films are formed by sputtering. A thickness of Co—Cr—Pt hard magnetic thin film is 40 nm whether or not a underlayer is used, and a thickness of Fe—Cr alloy thin film is 10 nm. By way of example, composition of Co—Cr—Pt hard magnetic thin film is specified to be 49 at. % Co-14 at. % Cr-17 at. % Pt, and composition of Fe—Cr alloy thin film is specified to be 90 at. % Fe-10 at. % Cr. A monolayer film has magnetic characteristics: 610 Oe of a coercive force; a value of 200 G·μm as a product between a residual magnetic flux density and a film thickness (hereinafter referred to as a magnetization quantity); and a ratio of 0.73 between a residual magnetic flux density and a saturation magnetic flux density (hereinafter referred to as a squareness). On the other hand, a film of Fe—Cr/Co—Cr—Pt has magnetic characteristics: a coercive force of 1035 Oe; a magnetization quantity of 430 G·μm; and a squareness of 0.90. Here, the magnetization quantity represents a magnitude of magnetic field produced from a magnetic film, and corresponds to a longitudinal bias magnetic field applied to the magnetoresistive effect film. Since an appropriate magnetization quantity required for the longitudinal bias layer to have in order to ensure a stable and high sensitivity operation of the MR head is one to twice the magnetization quantity of the magnetoresistive effect film, a sufficient quantity enough to apply a required longitudinal bias magnetic field is ensured to be obtainable by this Fe—Cr/Co—Cr—Pt.

Since an optimal magnitude of magnetization quantity in an MR head changes depending on the thickness of a magnetoresistive effect film and the like, in such instances, the thickness of a hard magnetic thin film can be changed accordingly. Further, when an Fe—Cr alloy thin film is utilized as a underlayer, coercive force as well as squareness are improved significantly. A greater value of coercive force is advantageous for stabilizing the longitudinal bias magnetic field and the like. Likewise, a greater value is advantageous for improving the squareness since the thickness of the hard magnetic thin film can be reduced.

Figure 3:
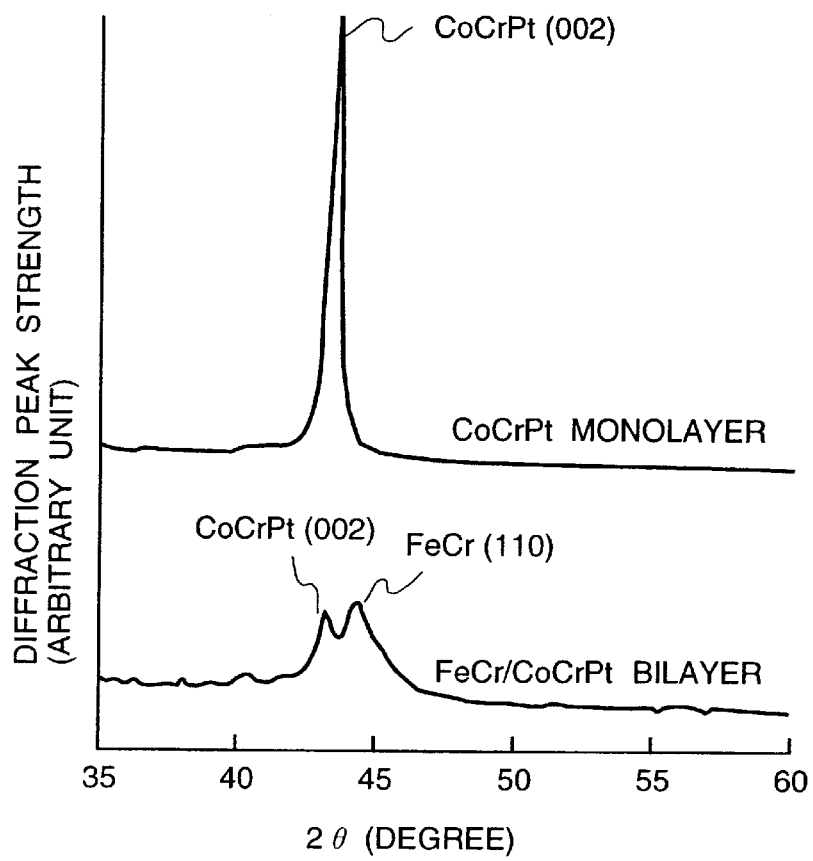
FIG. 3 is a diagram for comparison of X-ray profiles between the prior art monolayer hard magnetic film and the hard magnetic film of the invention having the ferromagnetic thin film having a body-centered cubic structure as the underlayer.

The reason why the coercive force and magnetization quantity are small in the case of the monolayer film resides in the fact that <001> direction of the crystal structure in its hard magnetic thin film is oriented perpendicular to its film surface. FIG. 3 is a diagram in which X-ray diffraction profiles of a Co—Cr—Pt monolayer film and a lamination film of Fe—Cr/Co—Cr—Pt are compared. Both films have their <001> crystal axes oriented perpendicular to their film planes, and have diffraction curves as indicated which were observed from (002) plane. A strength of diffraction, however, is greater for the monolayer film which is approximately 6 times as great as that of the laminated film, indicating that orientation of its <001> is greater than that of the laminated film. The Co—Cr—Pt film is a hexagonal crystal, and has a strong magnetic anisotropy in <001> direction. Thereby, any such strong <001> orientation as of the monolayer film will produce a perpendicular anisotropy, thereby reducing an in-plane component of magnetization. In the case where a underlayer of Fe—Cr alloy thin film is used, since the crystal structure of the underlayer is of a body-centered cubic lattice structure, and its <001> crystal axis is orientated perpendicular to the film plane, thereby a crystal orientation of Co—Cr—Pt film disposed on this underlayer is considered to have been affected and changed its <001> orientation.

Embodiment 2

Figure 4:
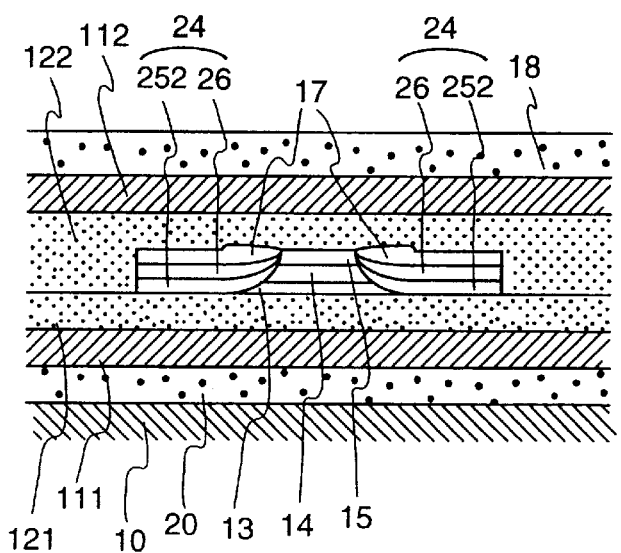
FIG. 4 is a cross-sectional view of an MR head in the vicinity of its sense area which utilizes an anisotropic magnetoresistive layer according to one embodiment of the invention.
Figure 5:
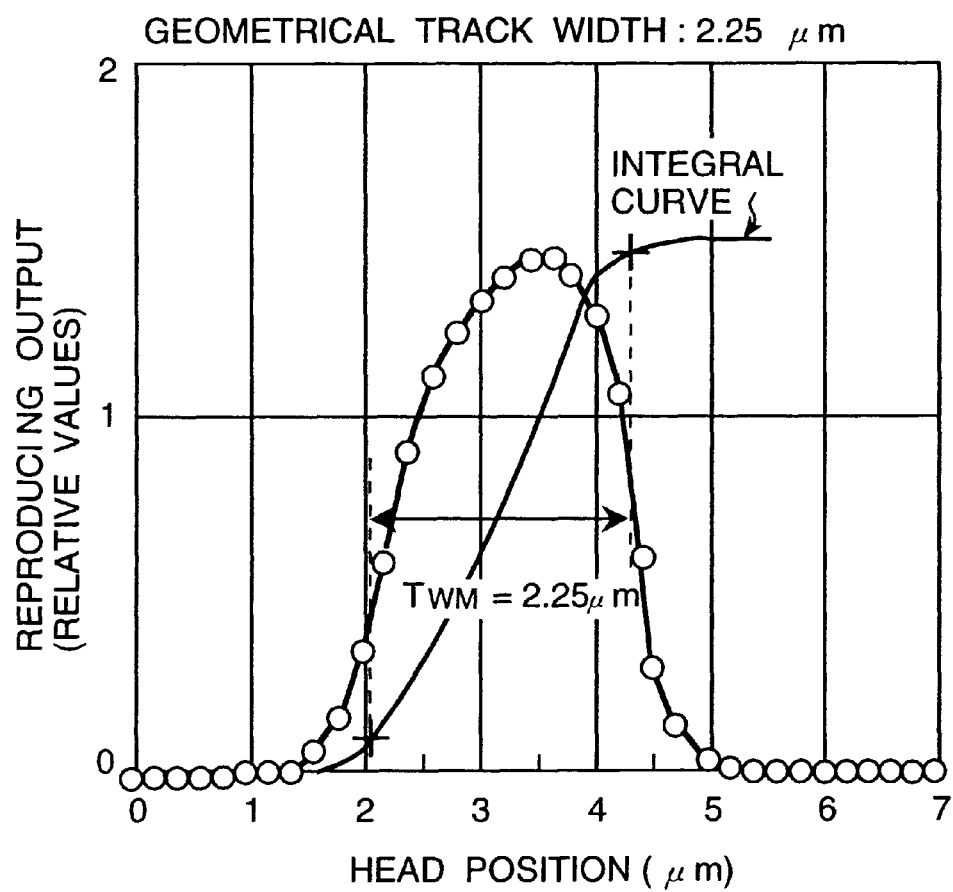
FIG. 5 is a diagram indicative of a distribution of sensitivity in track direction of an MR head having an underlayer of a ferromagnetic material having a body-centered cubic lattice structure of the invention.
Figure 6:
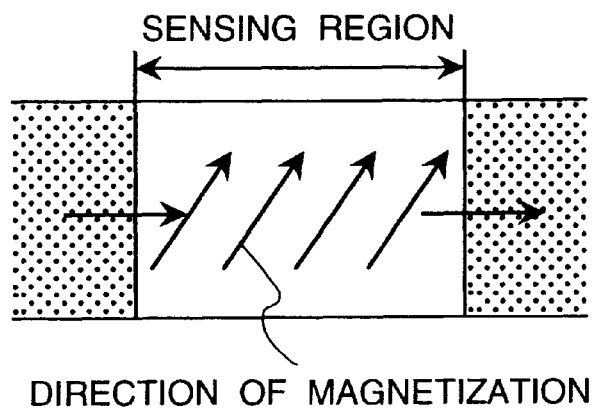
FIG. 6 is a schematic diagram indicative of a magnetization model according to the invention.

With reference to FIG. 4, a case where the thickness of a underlayer is as small as 5 to 20 nm will be described in the following. Both sides of a lamination of a soft magnetic thin film 13/spacer film 14/magnetoresistive effect film 15 are removed by etching such that only a signal detection area remains unetched, then longitudinal bias layer 24 and electrode film 17 are formed, thereby a longitudinal bias magnetic field derived from the longitudinal bias layer 24 can be impressed not only on magnetoresistive effect film 15 but also on soft magnetic thin film 13, thereby enabling suppression of Barkhausen noise due to soft magnetic thin film 13. Further, since magnetoresistive effect film 15 is limited to exist only in a signal detection area, an excellent magnetic head superior in its off-track characteristics can be obtained. When etching the both sides of the lamination of soft magnetic thin film 13/spacer film 14/magnetoresistive effect film 15, a width of soft magnetic thin film 13 disposed adjacent to a substrate is adapted to be greater than widths of the other films. Generally, a Ni—Fe thin film having a crystal structure of a face-centered cubic lattice is used as soft magnetic thin film 13. Therefore, in the case where no underlayer is utilized, a reproduction track side on the hard magnetic thin film is formed on the face-centered cubic lattice, where occurs a decrease in coercive force and corresponding Barkhausen noise. Further, when a non-magnetic thin film is used as a underlayer, the direction of magnetization in a region of the lamination the width of which is broader than the width of the magnetoresistive effect film made of the soft magnetic thin film becomes unstable consequently causing Barkhausen noise to occur. If a underlayer is used which is made of a ferromagnetic thin film or antiferromagnetic thin film which has a crystal structure having a body-centered cubic lattice, or an amorphous ferromagnetic thin film, there will be obtained such advantages that the coercive force of the hard magnetic thin film will not decrease, and magnetization in the soft magnetic thin film becomes stabilized due to an exchange coupling induced between the hard magnetic thin film and the soft magnetic thin film, thereby suppressing the occurrence of Barkhausen noise.

Further, it is important to adjust the magnitude of a longitudinal bias magnetic field to an appropriate value in order to suppress the Barkhausen noise without decreasing its output. Taking into account a change of the longitudinal bias magnetic field resulting from variations of its film thickness, it is more advantageous in order to minimize such variation to use as underlayer 252 having ferromagnetism, a thin film of Fe alloy with addition of Ni, Co, Si, V, Cr, Nb, etc., or a thin film of amorphous ferromagnetic materials to reduce its saturation magnetic flux density than to use an Fe thin film having a high saturation magnetic flux density. Further, use of an antiferromagnetic thin film having a film thickness sufficient to exhibit its intrinsic antiferromagnetism will be most preferable since it will block a magnetic field therefrom irrespective of its film thickness variation.

A magnetoresistive head according to the embodiment 2 of the invention is shown to have soft magnetic thin film 13, magnetoresistive effect film 15 and electrode film 17 disposed in this sequence from the side of a substrate, however, it is not limited to this sequence, and any change in this sequence will be in the scope of the invention.

As one of the features of this embodiment, a material which exhibits anisotropic magnetoresistive effect is used as a magnetoresistive effect film. Further, sputtering is utilized for manufacture of these thin films which will be described in detail in the following.

On non-magnetic substrate 10 made of ceramic is formed an aluminum film as insulating film 20 to a thickness of approximately 10 μm, and the surface of the aluminum film is polished. As lower shield layer 111, a Co—Hf—Ta alloy amorphous thin film is formed to a thickness of approximately 2 μm, which is then machined into a predetermined shape using ion milling. As lower gap layer 121, an aluminum film is formed to a thickness of 0.3 μm, on which are formed sequentially in lamination a Ni—Fe—Cr alloy thin film to a thickness of 40 nm as soft magnetic thin film 13 for applying a transverse bias field, a Ta thin film to a thickness of 20 nm as a spacer film 14, and a Ni—Fe alloy thin film to a thickness of 30 nm as magnetoresistive effect film 15, thereby to provide a lamination of films of a soft magnetic thin film, a spacer and a magnetoresistive effect film (hereinafter referred to as a soft magnetic thin film/spacer/ magnetoresistive effect film), which is machined into a predetermined shape. Forming a lift-off mask film on this lamination film at a position corresponding to a signal detection area, this lamination film is etched by ion milling in a manner such that a gradual slope is formed along both sides expanding toward the bottom of the soft magnetic thin film/spacer film/magnetoresistive effect film, and that only a portion of the lamination film corresponding to a sense area remains unetched. Then, an Fe—Cr alloy thin film is formed to a thickness of 10 nm as underlayer 252 for separating longitudinal bias layer 24, which has a body-centered cubic lattice crystal structure exhibiting ferromagnetism, and a Co—Pt—Cr hard magnetic thin film is formed on the backing layer as hard magnetic thin film 26 to a thickness of 40 nm, then, an Au thin film is formed thereon to a thickness of 0.2 µm as electrode film 17 for reading out a change of electrical resistance in magnetoresistive effect film 15. Removal of the lift-off mask completes the formation of a signal detection area. Then, formed upper gap layer 122 made of alumina to a thickness of 0.3 µm, and upper shield layer 112 made of Ni—Fe alloy to a thickness of approximately 2 µm, sequentially. Further, top insulating film 18 is formed thereon, then an element made of these laminated structure is manufactured into a recording inductive type magnetic head the detail of which manufacture is omitted.

After completion of film formation of the element, a direct current magnetic field of 5 k Oe is impressed to longitudinal bias layer 24 in a longitudinal direction of the magnetoresistive effect film (in the horizontal direction of the drawing) so as to polarize longitudinal bias layer 24. Then, machining the substrate to form a slider, manufacture of an MR head is completed.

According to one aspect of this embodiment of the invention, means for applying a transverse bias field is implemented by the provision of soft magnetic thin film 13 which is disposed via the spacer film 14 adjacent to magnetoresistive effect film, however, it is not limited thereto, and any other application method may be applied in the scope of the invention.

Further, as longitudinal bias layer 24, a lamination layer of Fe—Cr to the thickness of 10 nm/Co—Cr—Pt to the thickness of 40 nm is utilized, however, since this is only one aspect of this preferred embodiment, it is not limited to this specified thickness or to this specified combination of materials so long as it provides a magnetization quantity to this longitudinal bias layer in a range from one to twice the magnetization quantity of the magnetoresistive effect film. Adjustment of the magnetization quantity can be achieved by changing each film thickness of backing layer 252 which exhibits ferromagnetism and hard magnetic thin film 26 since they are coupled ferromagnetically. Further, if a magnetization quantity of the longitudinal bias layer is sufficiently large, the adjustment becomes possible also by causing the direction of polarization to tilt from a lengthwise direction of the magnetoresistive effect film to the direction of height thereof (i.e., vertical to the plane of the drawing).

Figure 7:
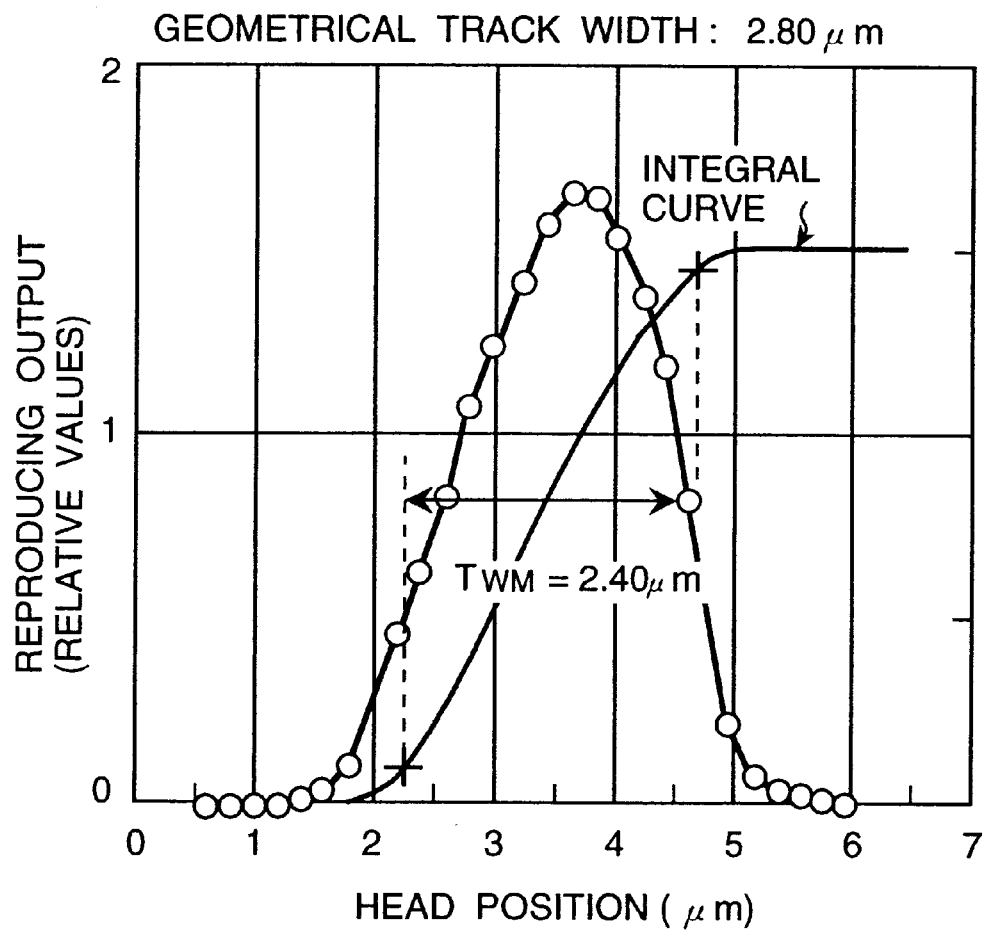
FIG. 7 is a diagram indicating a sensitivity distribution in track directions of a prior art MR head using a Cr backing.
Figure 8:
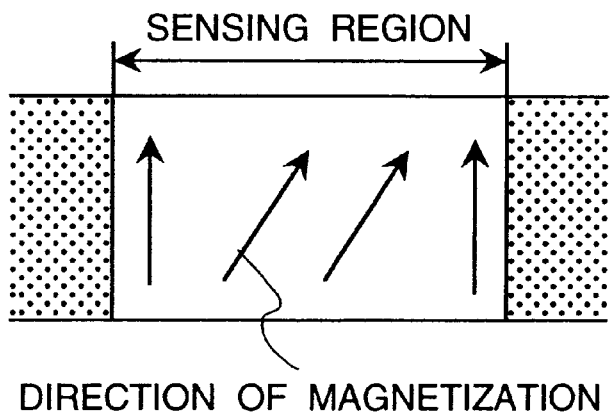
FIG. 8 is a schematic diagram indicative of a magnetization model according to the prior art.

With reference to FIGS. 5 to 8, in order to determine the effect of magnetic exchange coupling between the hard magnetic thin film and the magnetoresistive effect film, distributions of sensitivity in track directions are compared between the MR head of the invention (FIGS. 5 and 6) and an MR head using non-magnetic Cr as an underlayer (FIGS. 7 and 8). A method of this track profile measurement will be described. This track profile is obtained through the steps of writing a signal in a very narrow track as small as approximately 0.4 µm on a disk, reading this recorded signal by moving the MR head in a radial direction of the disk, and detecting a reproducing output at each position of the MR head. Therefore, abscissa of the drawing represents a travel distance, and ordinate thereof represents a reproduction output at each travel distance. Through such measurements of distributions of sensitivity in the track direction of the MR head, a reproduction sensitivity of the MR head is represented by a distribution curve having a peak value in the center thereof and lower values on both sides thereof, namely, having a mountainwise distribution. An actual reproducing voltage is considered to correspond to a value obtained by integrating these signals in the track direction. In the MR head with a non-magnetic underlayer having a reproduction output as indicated in FIG. 7, its geometrical track width (a gap between a pair of electrodes) is 2.8 µm, and its magnetic track width $T_{WM}$ is 2.4 µm which is a reduction by 0.4 µm than the geometrical width. Here, the magnetic track width is defined to correspond to a width of the integral curve which covers a range from 5% to 95% of a total value of integration for each output at each point in the track direction in the drawing. Therefore, the magnetic track width corresponds to an effective track width of the MR head. The reason why the magnetic track width is reduced as described above is considered due to that a direction of magnetization in the side portions of the magnetoresistive effect film is oriented partially in the normal line direction of the disk as indicated by a magnetization model in FIG. 8. When any magnetization in the side portions is oriented in the normal line direction, it blocks rotation of magnetization of the magnetoresistive effect film responding to a magnetic field signal from the recording medium, thereby in consequence, lowering sensitivity in the vicinity of the side portions. In this magnetic head, since there exists a dead zone in the side portions of the signal detection area, its output voltage is decreased. On the other hand, in the MR head using a ferromagnetic thin film as a underlayer according to the invention (FIG. 5), its magnetic track width $T_{WM}$ is 2.25 µm with respect to its geometrical track width of 2.25 µm, thereby substantially providing the same track width to the geometrical and the effective track widths. This is because that magnetization in the side portions of the magnetoresistive effect film of the MR head according to the invention is not oriented in the nominal direction of the disk, thereby there exists no dead zone which appears in the MR head using the non-magnetic underlayer, thereby as a result, producing a significantly improved output. By way of example, the magnetization model in the drawings of FIGS. 6 and 8 has oblique components of magnetization in its signal detection area, this is due to that a transverse bias field is applied to the magnetoresistive effect film.

As a result of the foregoing, it is confirmed that there exists a clear difference in the condition of magnetization in the side portions of a signal detection area between the MR head using a non-magnetic underlayer and the MR head according to the invention. This difference results from whether or not there exists a magnetic exchange coupling between the hard magnetic thin film and the magnetoresistive effect film or soft magnetic thin film. In the MR head of the invention, since magnetization in both the hard magnetic thin film and the magnetoresistive film are coupled in magnetic exchange coupling via the magnetic underlayer, the direction of magnetization in the side portions of the magnetoresistive effect film and the soft magnetic thin film is oriented in the same direction as the direction of magnetization in the hard magnetic thin film. In this instance, since magnetization in the hard magnetic thin film is polarized in the track direction of the MR head, magnetization of the magnetoresistive effect film and the soft magnetic thin film is aligned in the same direction as the track direction. On the other hand, in the MR head using a non-magnetic underlayer, there exists no magnetic exchange coupling between its hard magnetic thin film and its magnetoresistive effect film as well as soft magnetic thin film. It is known for any MR head which has a complicated lamination structure of insulating films including ceramics, and of metal films that there occurs an excessive stress concentration due to its complicated structure. Therefore, in particular, in such a region as the side portions of the signal detection area which were subjected to etching, an excessive stress concentration is likely to occur. When a stress is applied to a magnetoresistive effect film, magnetization therein tends to be directed to the direction of stress in accordance with its magnetostriction (or resist to be directed depending on the type of its magnetostriction). Rotation of magnetization in the side portions of the signal detection area of MR head using non-magnetic underlayers is considered to have occurred by such stress concentration. In the presence of the magnetic exchange coupling realized by the hard magnetic thin film of the invention, instability of magnetization which is likely to occur in the side portions of the signal detection area can be prevented from occurring.

Embodiment 3

Figure 1:
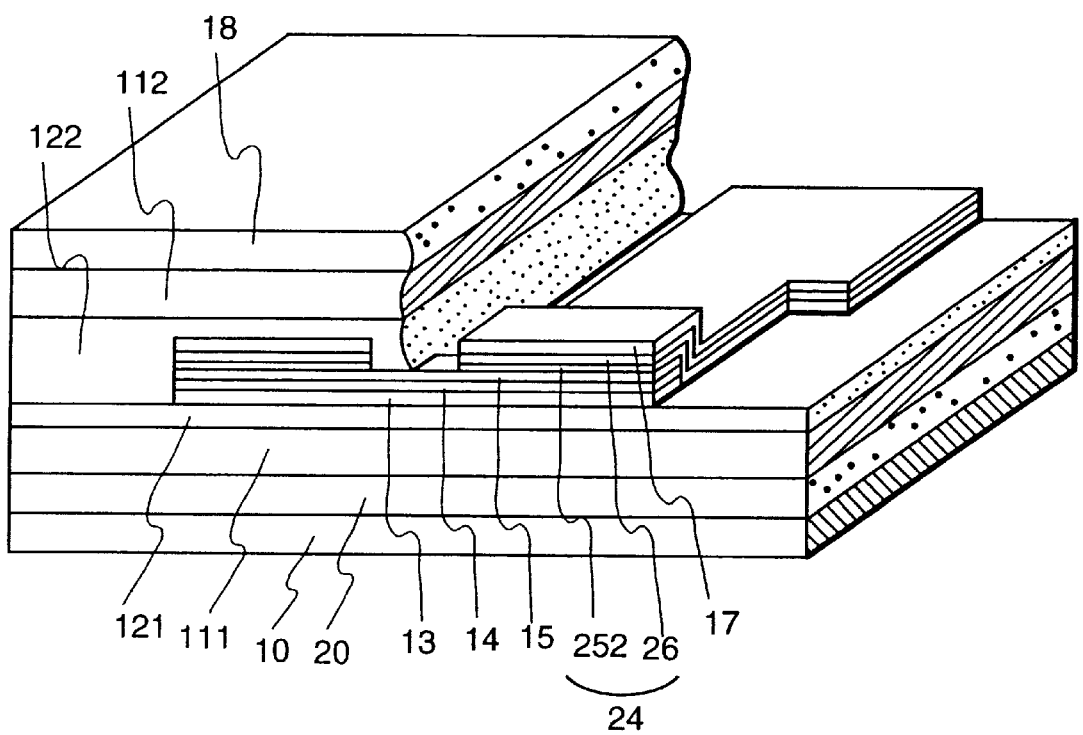
FIG. 1 is a perspective view of a schematic diagram in part of a magnetoresistive head of the invention.
Figure 9:
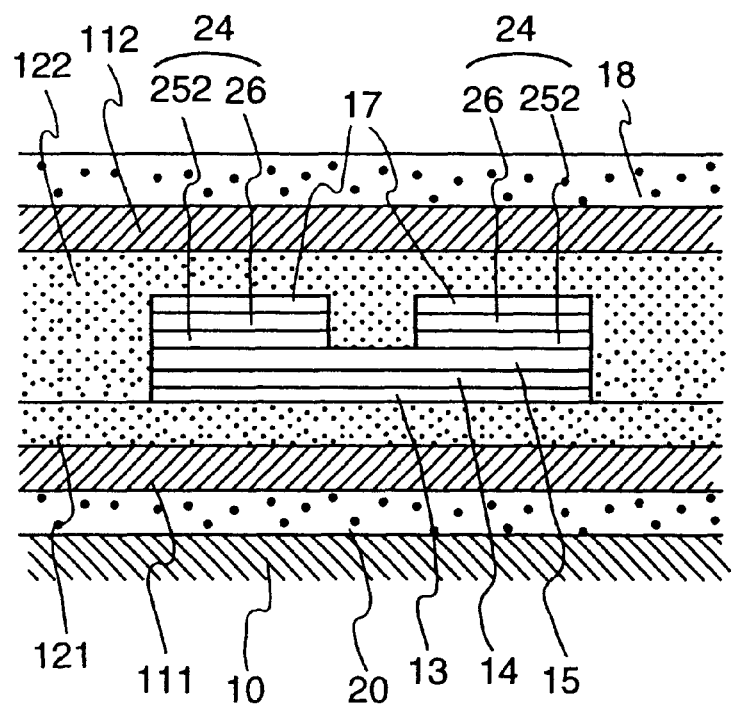
FIG. 9 is a cross-sectional view of another MR head in part in the vicinity of its magnetization sense area which utilizes the anisotropic magnetoresistive effect according to another embodiment of the invention.

FIG. 1 is a perspective view indicative of a structure of a magnetoresistive head of an embodiment 3 of the invention, and FIG. 9 is a cross-sectional view in part of the embodiment 3 in the vicinity of its magnetization sense area. On the surface of non-magnetic substrate 10 made of ceramics is formed an aluminum film as insulating film 20 to a thickness of approximately 10 μm, and the surface of which is subjected to precision polishing. Then, an amorphous thin film of Co—Hf—Ta alloy is formed by sputtering to a thickness of approximately 2 μm as lower shield layer 111, which is machined into a predetermined form by ion milling. After film formation of an alumina film as lower gap layer 121 to a thickness of 0.3 μm, on the surface of which, there are formed sequentially a Ni—Fe—Cr alloy thin film to a thickness of 40 μm as soft magnetic thin film 13 for applying a transverse bias field, a Ta thin film to a thickness of 20 μm as a spacer film 14, and a Ni—Fe alloy thin film to a thickness of 30 μm as magnetoresistive effect film 15 so as to form a lamination structure of a soft magnetic thin film/spacer film/magnetoresistive effect film, which is then machined into a predetermined shape. Then, a lift-off mask is formed on an area corresponding to a signal detection area. After cleaning the surface of the magnetoresistive film by sputter etching, is formed longitudinal bias layer 24 by sequentially forming an Fe thin film to a thickness of 10 nm as underlayer 252 which has a crystal structure of a body-centered cubic lattice and shows ferromagnetism, a Co—Pt—Cr hard magnetic thin film to a thickness of 32 nm as hard magnetic thin film 26, and an Au thin film to a thickness of 0.2 μm as electrode film 17 for reading a change of electrical resistance in magnetoresistive effect film 15. In this film forming, sputtering is used, with Ar gas at pressure of 5 m Torr, and its substrate temperature at room temperatures. Further, a lamination film made of an Fe thin film of 10 nm prepared on a glass substrate and of a Co—Pt—Cr hard magnetic thin film of 32 nm is found to have a coercive force of 1200 Oe, a Br/Bs at 0.80 which is a ratio of residual magnetic flux density Br to saturation magnetic flux density Bs (hereinafter referred to as squareness), and a residual magnetic flux density of 0.93 T. In this embodiment 3, Fe/Co—Cr—Pt lamination is used as longitudinal bias layer 24, which is a typical example of such lamination, however, it is not limited thereto, and any other modification of such should be construed within the scope of the invention. As a next step, the lift-off mask deposited with Fe/Co—Cr—Pt lamination film of longitudinal bias layer 24 and Au thin films of electrode film 17 is removed to provide a signal detection area. Then, upper gap layer 122 comprised of alumina is formed to a thickness of 0.3 μm followed by formation of upper shield layer 112 comprised of Ni—Fe alloy to a thickness of approximately 2 μm. Further, on the top thereof is formed insulating film 18, then this laminated structure is machined into a recording inductive magnetic head, further description of its manufacture is omitted. Then, the substrate is cut and machined into a slider member, and thus manufacture of a magnetoresistive head of the invention is completed.

Figure 15:
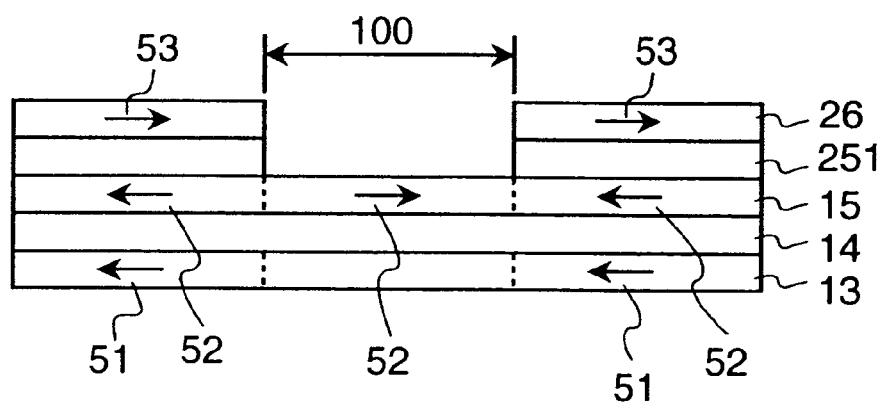
FIG. 15 is a diagram indicative of a film structure of a prior art MR head.
Figure 16:
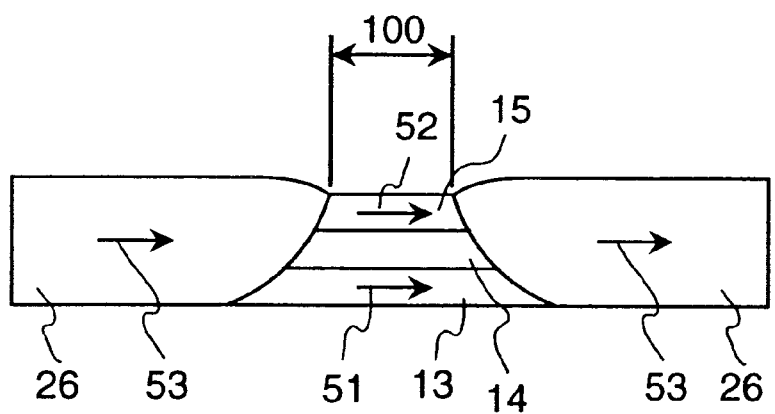
FIG. 16 is a diagram indicative of a film structure of another prior art MR head.

Using such magnetoresistive heads completed as above, occurrence of Barkhausen noise is examined. Various types of magnetoresistive heads have been compared and evaluated including such ones which have a longitudinal bias layer made of a Co—Pt—Cr hard magnetic thin film to a thickness of 80 nm but without a underlayer, and ones which have a longitudinal bias layer made of a Co—Pt—Cr hard magnetic thin film to a thickness of 52 nm provided with a non-magnetic underlayer made of Cr thin film to a thickness of 10 nm. By way of example, magnetic characteristics of a Co—Pt—Cr hard magnetic thin film formed to a thickness of 80 nm on a glass substrate is found to have a coercive force of 450 Oe, a squareness of 0.55 and a residual magnetic flux density of 0.49 T, and magnetic characteristics of a Co—Pt—Cr hard magnetic thin film formed to a thickness of 52 nm via a Cr thin film with a thickness of 10 nm on a glass substrate has a coercive force of 1500 Oe, a squareness of 0.85 and a residual magnetic flux of 0.75, which are different from magnetic characteristics of a lamination film of an Fe thin film to a thickness of 10 nm/Co—Pt—Cr hard magnetic thin film to a thickness of 32 nm, however, since a product of their residual magnetic flux density and their film thickness is identical, a quantity of magnetic flux produced by their longitudinal bias layers is considered to be approximately the same. Evaluation of Barkhausen noise is conducted in such a manner that a record pattern recorded at 5 k FCI in a thin film medium, wherein a product of its residual magnetic flux and its magnetic film's thickness is 150 G·μm is reproduced at a floating distance of 0.12 μm and using a sense current of 10 mA to observe a resultant waveform during its reproduction, and the number of heads in which Barkhausen noise did not occur was counted against a total number of observed heads to obtain a suppression rate of Barkhausen noise. While a suppression rate of Barkhausen noise for a magnetic head which utilizes as the longitudinal bias layer an Fe thin film/Co—Pt—Cr alloy hard magnetic thin film to a thickness of 32 nm was 100%, a suppression rate for a magnetic head which utilizes a Co—Pt—Cr alloy hard magnetic thin film to a thickness of 80 nm was 10%, and a suppression rate for a magnetic head which utilizes a Cr-thin film to a thickness of 10 nm/Co—Pt—Cr alloy hard magnetic thin film to a thickness of 52 nm was 65%. The reason why the suppression rate of Barkhausen noise in the magnetic head utilizing Co—Pt—Cr alloy hard magnetic thin film of 80 nm thick and without a underlayer was so small is due to the fact that since its Co—Pt—Cr alloy hard magnetic thin film was formed directly in contact on its magnetoresistive effect film which has a crystal structure of face-centered cubic lattice, its coercive force was reduced, thereby when exposed to an external magnetic field, magnetization in the longitudinal bias layer was rotated, thereby impairing effective action of the longitudinal bias magnetic field. Further, in the head using the hard magnetic lamination film with thickness of 52 nm having Cr thin film of 52 nm as the underlayer and Co—Pt—Cr alloy, direction of magnetization in its signal sense area is oriented to the same direction as the direction of magnetization in the longitudinal bias layer by the magnetic field derived from the longitudinal bias layer as indicated in FIG. 15. However, direction of magnetization in the magnetoresistive effect film below the longitudinal bias layer is oriented in the opposite direction from the direction of magnetization in the longitudinal bias layer by a magnetostatic action present in the side portions of the element. Therefore, formation of a magnetic domain wall is considered to arise in an area in the magnetoresistive effect film where the direction of magnetization is opposite, thereby causing a Barkhausen noise.

In this embodiment of the invention, longitudinal bias layer 24 comprised of a lamination layer including a underlayer of Fe thin film of 10 nm thick and Co—Pt—Cr alloy hard magnetic thin film of 32 nm thick was used, however, it is not limited thereto, and any other underlayers other than the Fe thin film may be used in the scope of the invention including such as a ferromagnetic thin film having a crystal structure of body-centered cubic lattice, an amorphous ferromagnetic thin film and an antiferromagnetic thin film having a crystal structure of body-centered cubic lattice.

A ferromagnetic thin film having a crystal structure of body-centered cubic lattice of the invention includes Fe—Ni alloy, Fe—Co alloy, Fe—Ni—Co alloy, and an alloy of Fe or any one of the aforementioned alloys with addition of at least one element selected from the group of Si, V, Cr, Nb, Mo, Ta, and W. When using such a underlayer as above, a thickness of its film is preferably large to promote crystal growth of a hard magnetic thin film and minimize magnetic interaction between grains so that a greater coercive force is obtained. On the other hand, the magnetic exchange coupling between the magnetoresistive effect film and the hard magnetic thin film will decrease with an increasing thickness of a underlayer. Therefore, it is preferable for the underlayer to have a thickness in a range from 5 to 20 nm at which the growth of a hard magnetic thin film will not be affected by the magnetoresistive effect film having the crystal structure of face-centered cubic lattice.

A material that can be used as the amorphous ferromagnetic thin film includes an amorphous alloy having as its main components Co and at least one element selected from the group of Ti, V, Zr, Nb, Mo, Hf, Ta, Y, Ru, Rh, Pd, Ag, and Pt, a typical example of which includes a Co—Zr—Nb alloy thin film, Co—Zr—Ta alloy thin film, Co—Hf—Nb alloy thin film, Co—Hf—Ta alloy thin film, and the like. From comparison of the amorphous ferromagnetic thin film/hard magnetic thin film lamination and the ferromagnetic thin film with body-centered cubic lattice/hard magnetic thin film lamination, it is found that in the case the thickness of the underlayer is larger than 30 nm, a larger coercive force is obtained when the ferromagnetic thin film with face-centered cubic lattice structure is used, however, in the case the thickness thereof is in a range from 5 to 20 nm, a resultant coercive force obtained by using an amorphous ferromagnetic thin film was approximately the same or slightly smaller than that obtained by using the ferromagnetic thin film with a body-centered cubic lattice crystal structure. This is considered due to that in the range of 5 to 20 nm of film thickness as opposed to the greater film thickness, the ferromagnetic thin film with a body-centered cubic lattice structure had insufficient crystallization and inadequate growth of crystal grains, thereby indicating no significant difference from that using the amorphous ferromagnetic thin film. Further, a magnetoresistive head which uses a Co—Hf—Ta alloy amorphous ferromagnetic thin film with 16 nm thick/Co—Pt—Cr alloy hard magnetic thin film with 32 nm thick, and which outputs the same amount of magnetic field from its longitudinal bias layer as that using an Fe thin film with 10 nm thickness/Co—Pt—Cr alloy hard magnetic thin film with 32 nm is found to have a 100% suppression rate for suppressing Barkhausen noise which is the same as that of the Fe thin film with 10 nm thickness/Co—Pt—Cr alloy hard magnetic thin film with 32 nm thickness.

The antiferromagnetic thin film having a body-centered cubic lattice crystal structure of the invention contains as its main components Cr, Mn and at least one element selected from the group of Cu, Au, Ag, Co, Ni and platinum metal. Since these antiferromagnetic thin films do not exhibit antiferromagnetism when their thickness is smaller than approximately 20 nm, their thickness needs to be more than 20 nm.

The hard magnetic thin film of the invention may be any alloy having as its main components Co and at least one element selected from the group of Cr, Ta, Ni, Pt, and Re, and a typical example of which is a Co—Pt—Cr alloy hard magnetic thin film, and also includes a Co—Re alloy hard magnetic thin film, Co—Cr alloy hard magnetic thin film, Co—Ta—Cr alloy hard magnetic thin film, Co—Ni—Pt alloy hard magnetic thin film, and the like. Also, any modification of these hard magnetic alloy thin films with addition at least one element selected from the group of silicon oxide, zirconium oxide, alumi oxide, and tantalum oxide should be construed within the scope of the invention.

Steps of manufacture of the MR head utilizing anisotropic magnetoresistive effect of this embodiment of the invention are the same as the steps of manufacture of the preceding embodiment until formation of a lamination of a soft magnetic thin film/spacer film/magnetoresistive effect film. Then, this soft magnetic thin film/spacer film/magnetoresistive effect film is machined into a predetermined shape pattern. After forming a lift-off mask on an area corresponding to a signal detection area, longitudinal bias application lamination layer 24 is formed by depositing an Fe—Cr alloy thin film having a body-centered cubic structure having a ferromagnetism as its underlayer 252, and a Co—Cr—Pt alloy hard magnetic thin film as its hard magnetic thin film 26 followed by formation of an Au thin film as electrode film 17 thereon. Then, the lift-off mask is removed so as to provide a signal detection area. The other steps afterwards are the same as in the preceding embodiment.

When a non-magnetic thin film such as Cr is used as a underlayer, as indicated in FIG. 15, a magnetic field derived from the hard magnetic thin film is recirculated through the ferromagnetic thin film which constitutes MR element below the hard magnetic thin film, thereby, a direction of magnetization in the magnetization sensing area of the magnetorestriction effect film and a direction of magnetization in areas other than the sensing area thereof become oriented in opposite directions from each other. On the other hand, when a ferromagnetic underlayer is used, the direction of magnetization in the magnetization sense area is oriented in the same direction as the direction of polarization of the longitudinal bias layer by the magnetic field derived from the longitudinal bias layer, and also the direction of magnetization in the areas other than the sensing area is oriented in the same direction as that of polarization in the longitudinal bias layer through the magnetic exchange coupling between the longitudinal bias layer and the magnetoresistive effect film. Accordingly, since there is formed no magnetic domain wall in the magnetoresistive effect film, an improved MR head free from Barkhausen noise can be provided.

Embodiment 4

Figure 10:
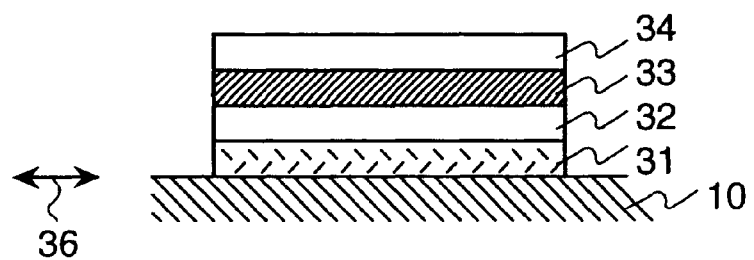
FIG. 10 is a schematic diagram indicative of a film structure of a macro magnetoresistive laminated layer.

The present invention is also capable of being applied to an MR head which utilizes macromagnetoresistive effect. One of the most simple and basic lamination structures which exhibit macromagnetoresistive effect is shown in FIG. 10, which comprises antiferromagnetic layer 31/magnetic thin film 32/non-magnetic conductive thin film 33/magnetic thin film 34. A direction of magnetization in magnetic thin film 32 is fixed perpendicular to the track directions, i.e., perpendicular to the plane of the drawing, by exchange coupling interaction with antiferromagnetic layer 31. Magnetic anisotropy in the track directions is induced in magnetic thin film 34, thereby under no application of external magnetic field, directions of magnetization in magnetic thin film 32 and magnetic thin film 34 are perpendicular from each other. When an external magnetic field is applied, the direction of magnetization in magnetic thin film 34 is caused to rotate, changing an angle relative to the direction of magnetization in magnetic thin film 32, thereby causing the electrical resistance to change. Generally, used as antiferromagnetic layer 31 are an Fe—Mn alloy antiferromagnetic film, Ni—Mn alloy antiferromagnetic film, NiO antiferromagnetic film, and used as magnetic thin films 32 and 34 is a Ni—Fe alloy thin film, and used as non-magnetic conductive thin film 33 is a Cu thin film. Further, the longitudinal bias magnetic field is applied to magnetic thin film 34 in which magnetization rotates.

Embodiment 5

Figure 11:
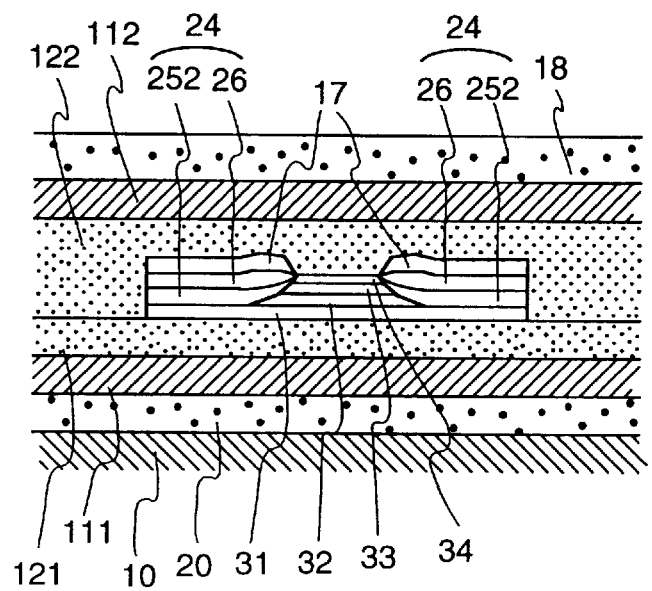
FIG. 11 is a cross-sectional view of another MR head in the vicinity of its magnetization sense area utilizing the anisotropic magnetoresistive effect of the invention.

FIG. 11 is a cross-sectional view in part in the vicinity of a magnetization sense area of an MR head using a magnetoresistive effect lamination film comprising the above-mentioned lamination structure according to another embodiment of the invention. Steps of manufacture of this MR head up to the step of manufacture of lower gap layer 121 are the same as those of the MR head utilizing the anisotropic magnetoresistive effect described above. On the surface of lower gap layer 121 are formed an antiferromagnetic thin film as antiferromagnetic layer 31 to a thickness of 100 nm, a Ni—Fe alloy thin film as magnetic thin film 32 to a thickness of 5 nm, a Cu thin film as non-magnetic conductive thin film 33 to a thickness of 3 nm, a Ni—Fe alloy thin film as magnetic thin film 34 to a thickness of 12 nm, then a Ta thin film as protective coat 35 to a thickness of 3 nm. This lamination layer is machined into a predetermined form, and a lift-off mask is formed on the surface of an area corresponding to a signal detection area. The other area of the Ta thin film not covered by the lift-off mask is removed leaving only a magnetization sense area by ion milling etching in a manner such that a gradual slope is formed on both sides expanding toward the bottom of the magnetoresistive effect lamination film. Then, longitudinal bias layer 24 of the invention is formed, for example, by sequentially forming an Fe-10 at % Cr alloy thin film to a thickness of 5 nm having a body-centered cubic structure exhibiting ferromagnetism as underlayer 252, and a Co—Pt—Cr alloy hard magnetic thin film to a thickness of 14 nm as hard magnetic thin film 26, followed by formation of an Au thin film to a thickness of 0.2 μm as electrode film 17. By way of example, a lamination layer prepared on a glass substrate of Fe-10 at % Cr alloy thin film of 5 nm thickness/Co—Pt—Cr alloy hard magnetic thin film of 14 nm thickness has shown to have a coercive force of 1500 Oe, a squareness of 0.85, and a residual magnetic flux density of 0.87 T. In the next, the lift-off mask is removed completing formation of the signal detection area. The subsequent steps will be omitted since they are the same as in the preceding embodiment.

For the purpose of comparison of Barkhausen noise suppression capability, a similar magnetoresistive head is manufactured utilizing as its longitudinal bias layer a Cr thin film with 5 nm thickness/Co—Pt—Cr alloy hard magnetic thin film with 27 nm thickness. While the suppression rate was 100% for the head utilizing Fe-10 at % Cr alloy thin film with 5 nm thickness/Co—Pt—Cr alloy hard magnetic thin film with 14 nm thickness, it was 70% for the head utilizing Cr thin film with 5 nm/Co—Pt—Cr alloy hard magnetic thin film with 27 nm thickness. By way of example, a lamination layer prepared on a glass substrate of Cr thin film with 5 nm thickness/Co—Pt—Cr alloy hard magnetic thin film with 27 nm thickness indicated a magnetic property such as a coercive force of 1700 Oe, a squareness of 0.90 and a residual magnetic flux density of 0.59 T.

After completion of all the steps of forming these thin films above, a heat treatment process is required to cool the temperature from above the Neel temperature of the antiferromagnetic layer under application of a d.c. magnetic field in order to provide a magnetic exchange coupling between antiferromagnetic layer 31 and magnetic thin film 32 such that the direction of magnetization in magnetic thin film 32 is fixed in a direction perpendicular to track directions, i.e., in a direction perpendicular to the plane of the drawing. Then, the longitudinal bias layer is polarized in a lateral direction, i.e., horizontal direction, of the magnetoresistive effect lamination film, then, the substrate is cut out, machined into a slider to complete the manufacture of the MR head.

In this embodiment 5 of the invention, its MR head is described to have a lamination of films sequentially disposed from the side of its substrate in the order of antiferromagnetic layer 31/magnetic thin film 32/non-magnetic conductive thin film 33/magnetic thin film 34, and electrode thin film 17, however, it is not limited thereto, and any modification in the order of these film formation should be construed within the scope of the invention. However, in the case when they are in the order of magnetic thin film 34/non-magnetic conductive thin film 33/magnetic thin film 32/antiferromagnetic layer 31, it is preferable for antiferromagnetic layer 31 to be a conductive antiferromagnetic film such as an Fe—Mn alloy antiferromagnetic thin film, Ni—Mn alloy antiferromagnetic thin film, and the like.

Embodiment 6

Figure 12:
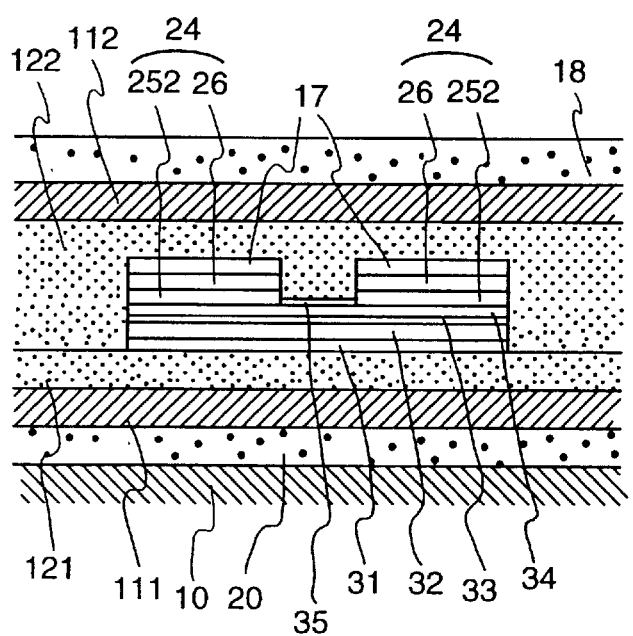
FIG. 12 is a cross-sectional view of still another MR head in the vicinity of its magnetization sense area utilizing a magnetoresistive effect film of the invention.

An MR head having a magnetoresistive effect lamination layer comprised of an antiferromagnetic layer/magnetic thin film/non-magnetic conductive thin film/magnetic thin film is also capable of being provided in a structure as indicated in FIG. 12 having longitudinal bias layer 24 and electrode 17 disposed on both sides the magnetoresistive effect lamination film.

Also in an MR head utilizing the macromagnetoresistive effect, a quantity of magnetization in the longitudinal bias layer has a significant influence on the stability and reproduction output of the head. An optimal quantity of magnetization in the longitudinal bias layer is one to three times the quantity of magnetization in magnetic thin film 34.

Hereinabove, the longitudinal bias layer according to the invention has been illustrated by way of example of the ferromagnetic thin film having a body-centered cubic lattice crystal structure, however, it is not limited thereto, and substantially the same effect can be obtained when an amorphous ferromagnetic thin film or an antiferromagnetic thin film having a body-centered cubic lattice crystal structure is used.

A material suitable for use as the amorphous ferromagnetic thin film of the invention includes an amorphous alloy containing as its main components Co and at least one element selected from the group of Ti, V, Cr, Zr, Nb, Mo, Hf, Ta, Y, Ru, Rh, Pd, Cu, Ag, Au and Pt. A typical example of such materials includes a Co—Zr—Nb alloy thin film, Co—Zr—Ta alloy thin film, Co—Hf—Nb alloy thin film, Co—Hf—Ta alloy thin film. These materials are formed by sputtering, however, when the content of Co exceeds 90 at %, no amorphous state results in, and when the content is less than 70 at %, magnetization is likely to be lost, thereby, preferably, an upper limit of Co content is 90 at %, and a lower limit thereof is 70 at %.

Figure 13:
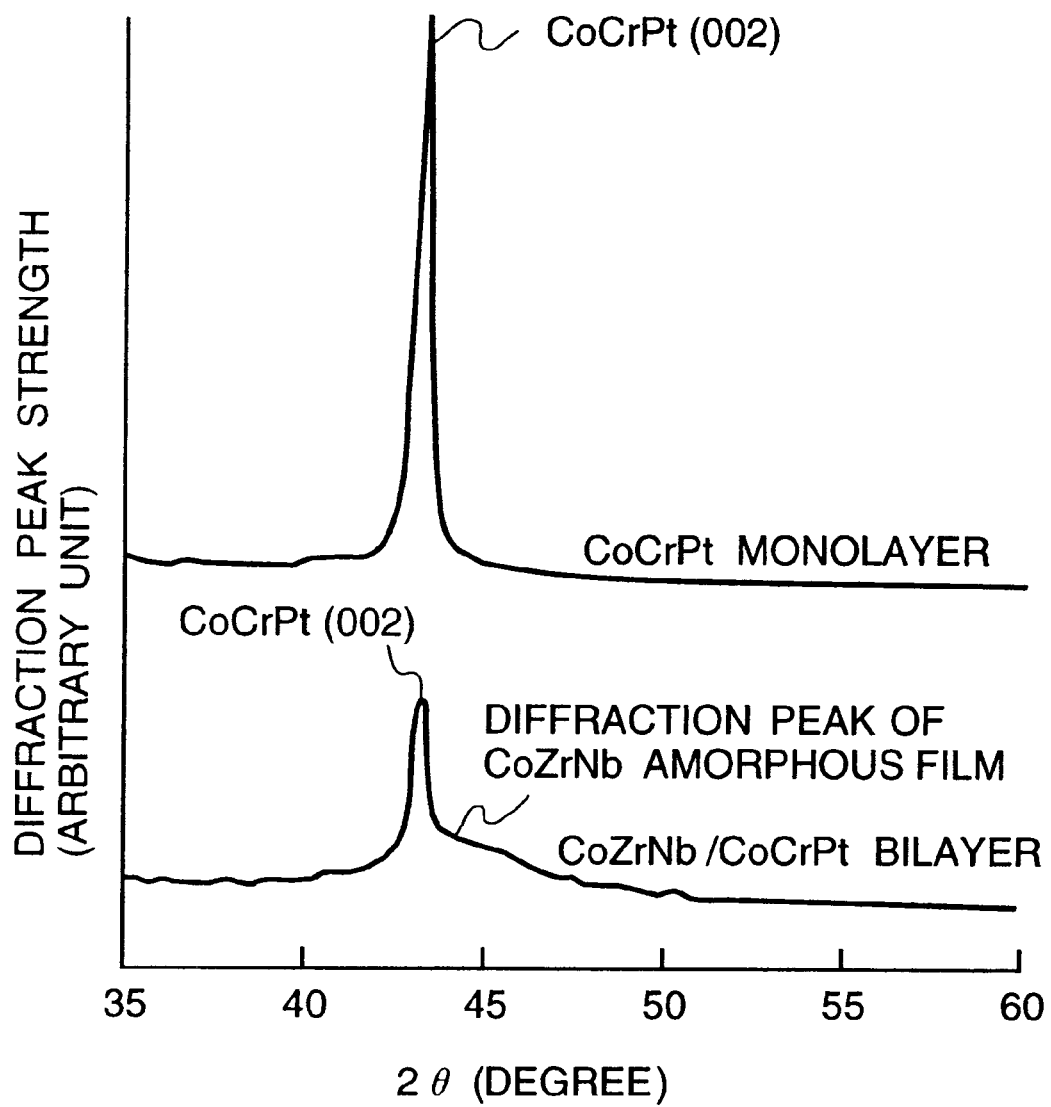
FIG. 13 is a diagram for comparison of X-ray profiles between the prior art monolayer hard magnetic thin film and the hard magnetic thin film which utilizes an amorphous ferromagnetic thin film as an underlayer according to the invention.

FIG. 13 compares X-ray diffraction profiles obtained with a Co—Cr—Pt monolayer and with a lamination film of Co—Zr—Nb/Co—Cr—Pt which uses as its underlayer a Co—Zr—Nb alloy thin film to a thickness of 20 nm which is an example of an amorphous ferromagnetic thin film, and on the surface of which is laminated a Co—Cr—Pt alloy hard magnetic thin film. It is noted from the profile of Co—Zr—Nb/Co—Cr—Pt lamination that there exists a broad diffraction curve component due to the Co—Zr—Nb alloy thin film, and a peak diffraction component thereof due to (002) plane of Co—Cr—Pt, and that a <001> crystal axis of the Co—Cr—Pt thin film is oriented perpendicular to its film plane. When a strength of diffraction of Co—Cr—Pt (002) component of Co—Zr—Nb/Co—Cr—Pt is compared with those of the Co—Cr—Pt monolayer and of the Fe—Cr/Co—Cr—Pt lamination of FIG. 3, it is approximately one third of that of the Co—Cr—Pt monolayer, but is about twice of that of Fe—Cr/Co—Cr—Pt, thereby it is concluded from these findings that a degree of orientation of <001> plane in Co—Zr—Nb/Co—Cr—Pt is smaller than that in the monolayer but is higher than that in Fe—Cr/Co—Cr—Pt. Since Co—Cr—Pt has a strong magnetic anisotropy in the direction of <001>, the smaller the strength of diffraction in Co—Cr—Pt (002) indicates presence of the more component of magnetization within its intraplane. Thereby, use of Co—Zr—Nb alloy amorphous ferromagnetic thin film as a underlayer can also improve the magnetic property of the hard magnetic thin film, although its effect is not as great as that of Fe—Cr alloy ferromagnetic film.

As a material suitable for use as an antiferromagnetic thin film having a crystal structure of a body-centered cubic lattice, an alloy containing as its main components Cr, Mn and at least one element selected from the group of Cu, Au, Ag, Ni and platinum metal can be used. A preferred range of compositions of these elements when given in terms of $(Cr_{100-c}Mn_c)_{100-d}X_d$, where X represents an added element, is specified as follows. $30 \leq c \leq 70$, $0 \leq d \leq 30$. This range of compositions ensures the maximum magnetic exchange coupling interaction. As to the thickness of film, a film thickness of 20 nm or more is required since when it is thinner than 20 nm no antiferromagnetism is exhibited. A degree of improvement in the magnetic properties of the hard magnetic thin film is substantially the same as that when the ferromagnetic this film having a crystal structure of a body-centered cubic lattice was used.

When using this antiferromagnetic thin film as a underlayer, it is desirable, in order to align the direction of magnetization in the antiferromagnetic thin film in the lateral or longitudinal direction thereof, to subject the same to a heat treatment in a dc magnetic field. In the case of an MR head which applies a magnetoresistive effect film utilizing a macromagnetoresistive effect, antiferromagnetic layer 31 is provided to fix the direction of magnetization in magnetic thin film 32 as indicated in FIG. 10. Since directions of polarization in antiferromagnetic layer 31 and in an antiferromagnetic thin film serving as a underlayer in a longitudinal bias application lamination are different, it is necessary for them to use a different material having a different blocking temperature, or to select as the antiferromagnetic thin film for the underlayer of the longitudinal bias application lamination some other composition which can exhibit the exchange coupling without being subjected to heat treatment Embodiment 7

Figure 14:
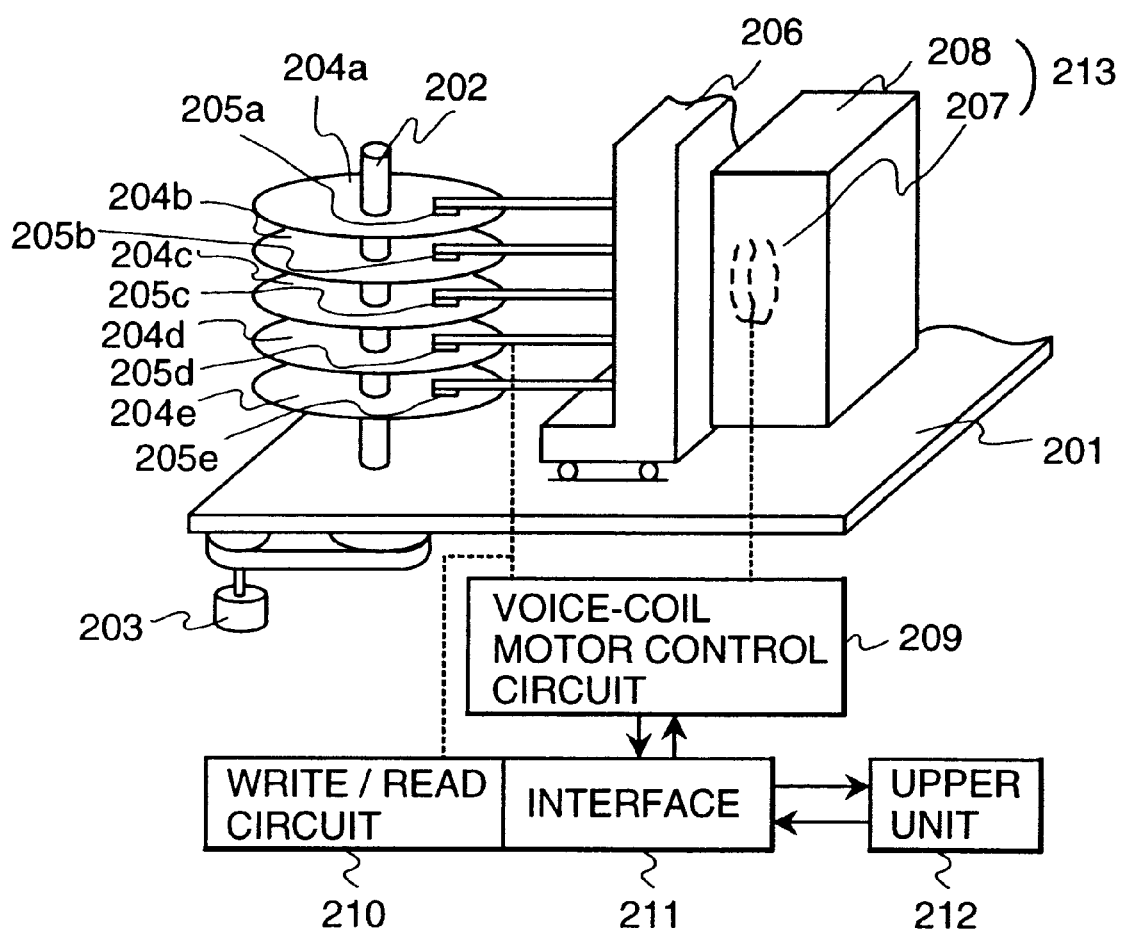
FIG. 14 is a diagram indicative of a magnetic disk system utilizing an MR head according to one embodiment of the invention.

With reference to FIG. 14, a schematic arrangement of magnetic disk equipment using an MR head of an embodiment of the invention is shown. In the drawing, the MR head of the invention is seen as applied to a magnetic recording and reproducing device in the magnetic disk equipment, but it is not limited thereto, and it can be applied to any magnetic recording and reproducing device such as magnetic tape equipment and the like within the scope of the invention.

This magnetic disk equipment will be described in detail with reference to the drawing of FIG. 14. This magnetic disk equipment is comprised of spindle 202, a plurality of magnetic disks 204a, 204b, 204c, 204d, 204e, each disk being stacked at an even distance from each other along the axis of spindle 202, and a motor which drives spindle 202. Further, the equipment is provided with carriage 206 mounted movably, a plurality of magnetic heads 205a, 205b, 205c, 205d, 205e to be carried by carriage 206, voice coil motor 213 including magnet 208 and voice coil 207 for actuating carriage 206, and base 201 for supporting these components described above. The same is also provided with voice coil motor control circuit 209 which in response to a signal from upper control equipment 212 controls voice coil motor 213, and write/read circuit 210 which has a function to convert data transmitted from upper control equipment 212 to a current to be supplied to a corresponding magnetic head in accordance with a write method associated with magnetic disk 204a and the like as well as to amplify data sent from magnetic disk 204a and the like and convert an amplified data to a digital signal, the write/read circuit 210 being connected to upper control equipment 212 via interface 211.

Data read-out operation to read data from magnetic disk 204d in the magnetic disk equipment will be described in the following. A command which data to read from the disk is given from upper controller 212 to voice coil motor control circuit 209 via interface 211. In response to a control current from voice coil motor control circuit 209, voice coil motor 213 actuates carriage 206 to move at a high speed the group of magnetic heads 205a, 205b, 205c, 205d, 205e and pinpoints 205d precisely at a position over a track on magnetic disk 204d where the data to read is stored. This precise pinpointing is implemented by magnetic head 205d which reads out servo information stored together with data in magnetic disk 204d and by supplying its positioning information to voice coil motor control circuit 209. Motor 203 mounted on base 201 rotates the plurality of magnetic disks 204a, 204b, 204c, 204d, 204e coupled to spindle 202. In response to a read signal from write/read circuit 210, a designated magnetic disk 204d is selected, and upon detection of a leading position of an area designated, magnetic head 205d reads out data signal therefrom. This data read is implemented by data exchange between magnetic head 205*d* coupled to write/read circuit 210 and magnetic disk 204*d*. A data which is read out is converted to a predetermined signal which is then transmitted to upper control equipment 212.

Although data read out operation is explained by way of example of magnetic disk 204*d*, it is the same with any other magnetic disks. Further, the magnetic disk equipment in FIG. 14 is depicted to have five magnetic disks, but it is not limited thereto, and any number of disks may be used within the scope of the invention.

Embodiment 8

Figure 17:
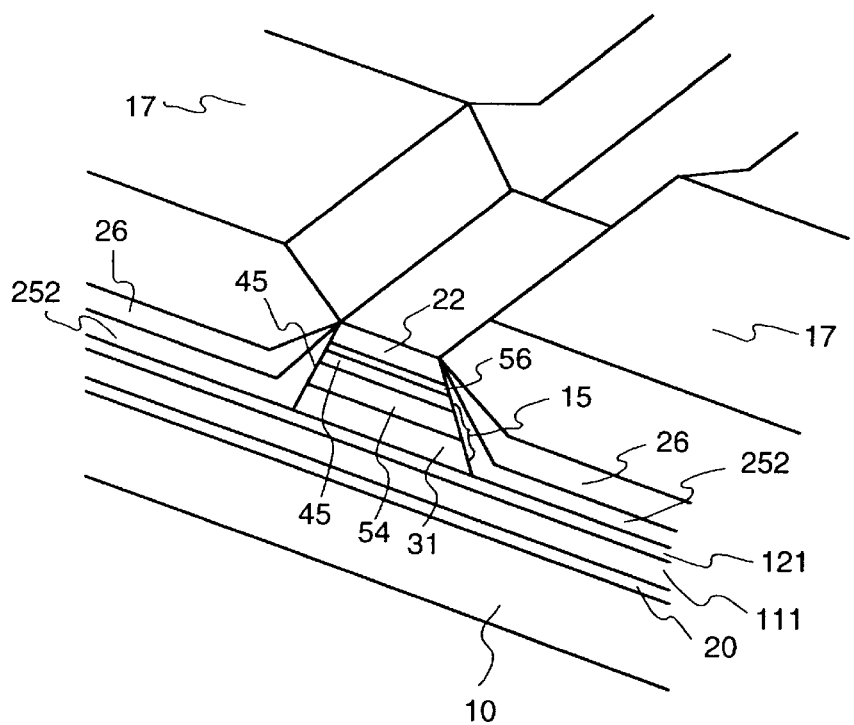
FIG. 17 is a cross-sectional view of another MR head in part in the vicinity of its magnetization sense area utilizing a magnetoresistive film layer according to still another embodiment of the invention.

A magnetoresistive effect type head of still another embodiment 8 of the invention is shown in FIG. 17, which has a magnetoresistive effect lamination layer comprised of an antiferromagnetic layer/magnetic thin film/non-magnetic conductive thin film/magnetic thin film. Both sides of its magnetoresistive effect lamination layer are cut out to form longitudinal bias layer 24 and electrode film 17 abutting the cut out sides thereof as depicted in FIG. 17. In this arrangement, use of magnetic underlayer 252 for the longitudinal bias layer also stabilizes magnetization in magnetic thin film 32 in the vicinity of the substrate, and is capable of suppressing Barkhausen noise.

In this embodiment 8, the lamination of the magnetoresistive effect type head is depicted to have been prepared from the side of the substrate in the order of antiferromagnetic layer 31/magnetic thin film 32/non-magnetic conductive thin film 33/magnetic thin film 34, and electrode film 17, however the sequence of preparation is not limited thereto, and any modification thereof should be construed within the scope of the invention. However, in the case where a lamination in the order of magnetic thin film 34/non-magnetic conductive thin film 33/magnetic thin film 32/antiferromagnetic layer 31 is chosen, its antiferromagnetic layer 31 is preferred to be a conductive antiferromagnetic thin film.

Embodiment 9

Figure 18:
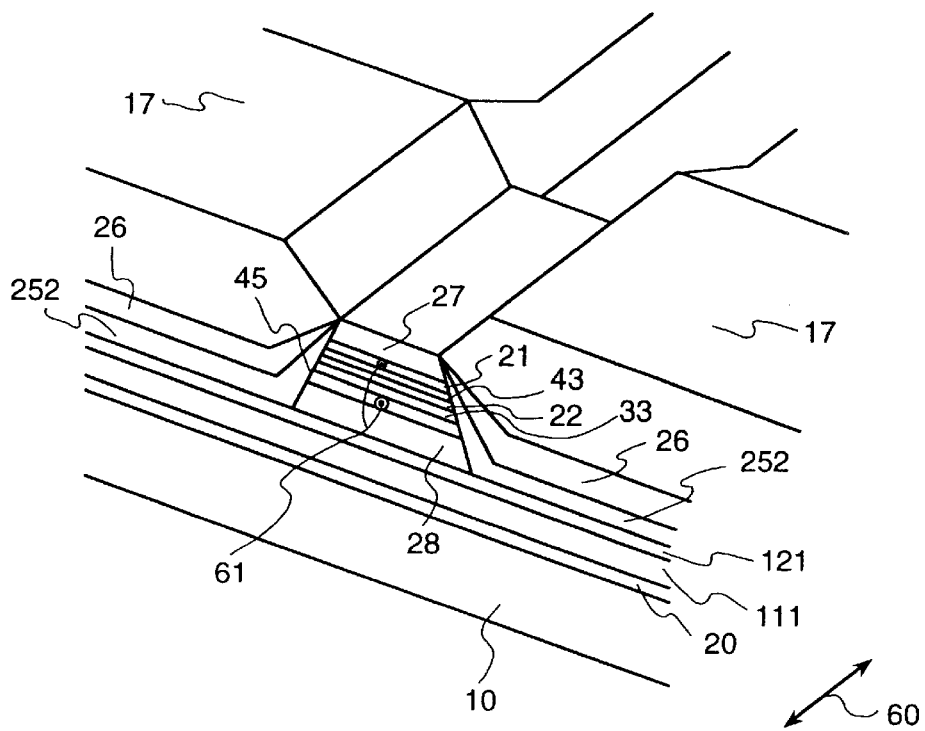
FIG. 18 is a perspective view of a magnetoresistive head in the vicinity of its magnetization sense area of one embodiment of the invention.

A perspective view in part of the structure of a magnetoresistive effect type head of another embodiment 9 according to the invention is illustrated in FIG. 18. Soft magnetic thin film 13 is formed, on the surface of which is formed non-magnetic conductive thin film 14, then magnetoresistive effect film 15 is formed thereon. 80 at % NiFe is used as magnetoresistive effect film 15. Then, on the surface of an active center area thereof is formed a photoresist mask in a stencil. Subsequently, areas not covered by the photoresist of the above-mentioned soft magnetic thin film 13, i.e., the above-mentioned non-magnetic conductive thin film 14 and the above-mentioned magnetoresistive effect film 15 are removed partially by ion milling. At this time, the substrate is rotated with an appropriate angle maintained relative to the axis of ion beam such that taper 45 is formed extending toward the bottom. Then, longitudinal bias layer 24 is formed which includes hard magnetic thin film 26 which forms a side portion passive area and underlayer 252 which exhibits ferromagnetism and has a body-centered cubic lattice structure, followed by provision of electrode film 17 thereon. A material used as hard magnetic thin film 26 includes $Co_{0.82}Cr_{0.09}Pt_{0.09}$ thin film or $Co_{0.80}Cr_{0.08}Pt_{0.09}(ZrO_2)_{0.03}$ thin film. A material used as underlayer 252 exhibiting ferromagnetism includes Fe—Cr alloy of the embodiment 2 of the invention. RF sputtering is used to deposit hard magnetic thin film 26 and ferromagnetic underlayer 252, with a $ZrO_2$ chip being disposed on a target in order to adjust a $ZrO_2$ concentration within a CoCrPt film. A thickness of hard magnetic thin film 26 is selected to be 50 nm and 52 nm respectively so that the same bias magnetic field is applicable to the active center area by the $Co_{0.82}Cr_{0.09}Pt_{0.09}$ thin film and by the $Co_{0.80}Cr_{0.08}Pt_{0.09}(ZrO_2)_{0.03}$ thin film, respectively. Each coercive force available by the above is 600 Oe and 1200 Oe, respectively. Residuals of the hard magnetic thin film, the underlayer having a body-centered cubic lattice structure and the electrode film were removed by lift-off. Soft magnetic thin film 13 applies transverse bias field 44 to magnetoresistive effect film 15, and longitudinal bias layer 24 applies longitudinal bias magnetic field 46 to magnetoresistive effect film 15. After fabrication of magnetoresistive effect film 15 into a predetermined shape having taper 45 on both sides thereof, the longitudinal bias layer is deposited in lamination to a thickness which is less than a total thickness of a lamination of soft magnetic thin film 13, spacer film 14 and magnetoresistive effect film 15, and residuals of deposits remaining on the surface of magnetoresistive effect film 15 are removed thereby the longitudinal bias layer is provided in regions abutting edge portions of magnetoresistive effect film 15 and along the taper. Then, electrode film 17 is formed which has a taper at a portion thereof in contact with magnetoresistive effect film 15. Numeral 121 depicts a lower gap layer made of alumina to a thickness of 0.4 $\mu$m, numeral 111 depicts a lower shield layer made of NiFe alloy to a thickness of about 2 $\mu$m, and numeral 20 depicts an insulating film formed to a thickness of 10 $\mu$m on the surface of non-magnetic substrate 10 and polished to provide a smooth surface on the substrate. As non-magnetic substrate 10 used is a TiC containing alumina sintered body. Used as non-magnetic conductive thin film 14 is a Ta film with a thickness of 200 Å. 80 at % Ni—Fe alloy with a thickness of 400 Å is used as magnetoresistive effect film 15.

As a result of measurements of electromagnetic conversion characteristics using these magnetic heads, it is found that while a head using a $Co_{0.82}Cr_{0.09}Pt_{0.09}$ film exhibited an output variation of 20% and a waveform variation of 10%, a head using a $Co_{0.80}Cr_{0.08}Pt_{0.09}(ZrO_2)_{0.03}$ thin film advantageously exhibited an output variation of 5% or less and a waveform variation within 5%. Thereby, it is confirmed that use of $Co_{0.80}Cr_{0.08}Pt_{0.09}(ZrO_2)_{0.03}$ as hard magnetic thin film 26 will improve advantageously its BHN suppression capability and waveform variation suppression effects.

The active center area is comprised of an MR film, soft magnetic thin film 13 which is a soft bias film for applying the lateral bias, and spacer film 14 which is interposed between these two magnetic thin films to separate the both from each other. The passive edge areas are formed by longitudinal bias layers 24 which apply a longitudinal bias to the active center area. A side junction area has two tapers in both sides of the active center area.

This hard magnetic film 26 provides a longitudinal bias to the active center area through a leakage magnetic field derived from the hard magnetic thin film and a magnetic coupling in the junction area between the hard magnetic film and the active center area. The hard magnetic film is required to apply a magnetic field to the active center area stably in response to a magnetic field from the magnetic medium in order to suppress BHN, thereby it is preferable for the hard magnetic film to have a coercive force of 1000 Oe or more.

Embodiment 10

Figure 19:
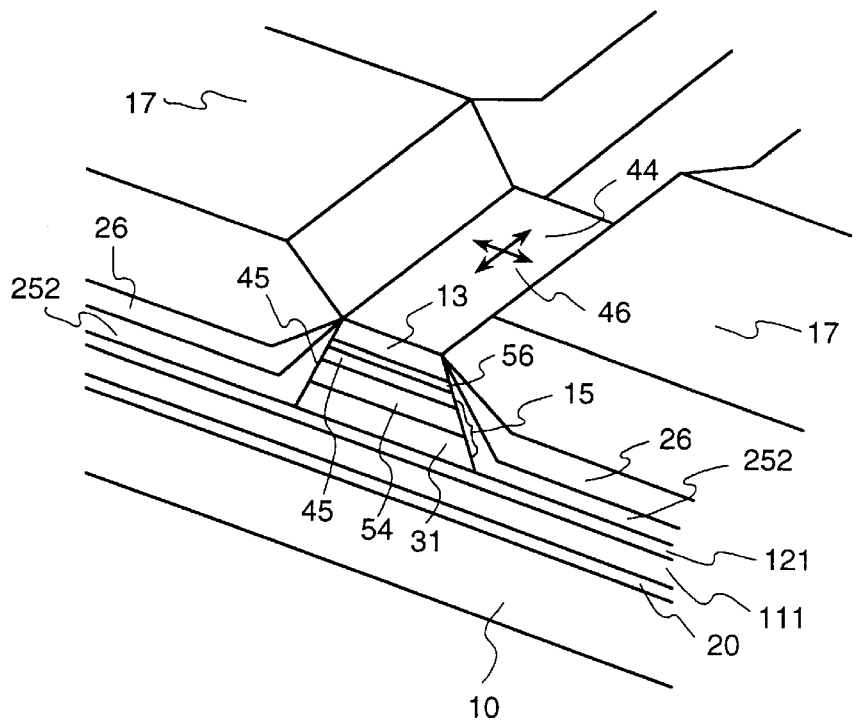
FIG. 19 is a perspective view of a magnetoresistive head in the vicinity of its magnetization sense area of another embodiment of the invention.

FIG. 19 is a perspective view of a magnetoresistive effect head of still another embodiment 10 according to the invention.

This embodiment 10 has substantially the same structure as the embodiment 5 except for a laminated structure of its magnetoresistive effect head. On the surface of lower gap layer 121 made of alumina is formed antiferromagnetic layer 31 made of NiO to a thickness of 50 nm, then sequentially, formed a lamination of magnetoresistive effect film 15 which includes 80 at % Ni—Fe alloy film 54 to a thickness of 1 nm and Co film 45 to a thickness of 1 nm, then non-magnetic conductive thin film 56 formed of Cu to a thickness of 2 nm, and soft magnetic thin film 13 made of NiFe alloy to a thickness of 5 nm for lateral bias application.

Magnetoresistive film 15 according to this embodiment 10 comprises a thin non-magnetic film (Cu) interposed between two magnetic films (NiFe), and an antiferromagnetic film (NiO) juxtaposed to one of the two magnetic films. This structure is conceived to eliminate instability in production steps and prevent the sensitivity of magnetic heads from decreasing due to a shunt of current. Further, using as the antiferromagnetic film an oxide film of NiO which has a higher resistance to corrosion during manufacture than FeMn which is a conventional material, an improved reliability in mass production has been achieved. Further, an output from the head is determined by a product of a current to flow through the head and a change of resistance in a spin valve film, wherein the antiferromagnetic film itself does not contribute at all to the change of resistance in the spin valve film. Thereby, through use of NiO which is an insulating material as the antiferromagnetic film, it has become possible to cause an input current effectively to contribute to a resistance change, thereby to obtain an improved sensitivity to magnetic fields. Accordingly, a recording density as high as approximately 5 Gb/in$^2$ can be achieved by this embodiment 10 of the invention.

Further, by using as soft magnetic thin film 13 a NiFe alloy with oxides dispersed therein likewise in the embodiment 9, an improved reproducing output can be obtained.

Embodiment 11

Figure 20:
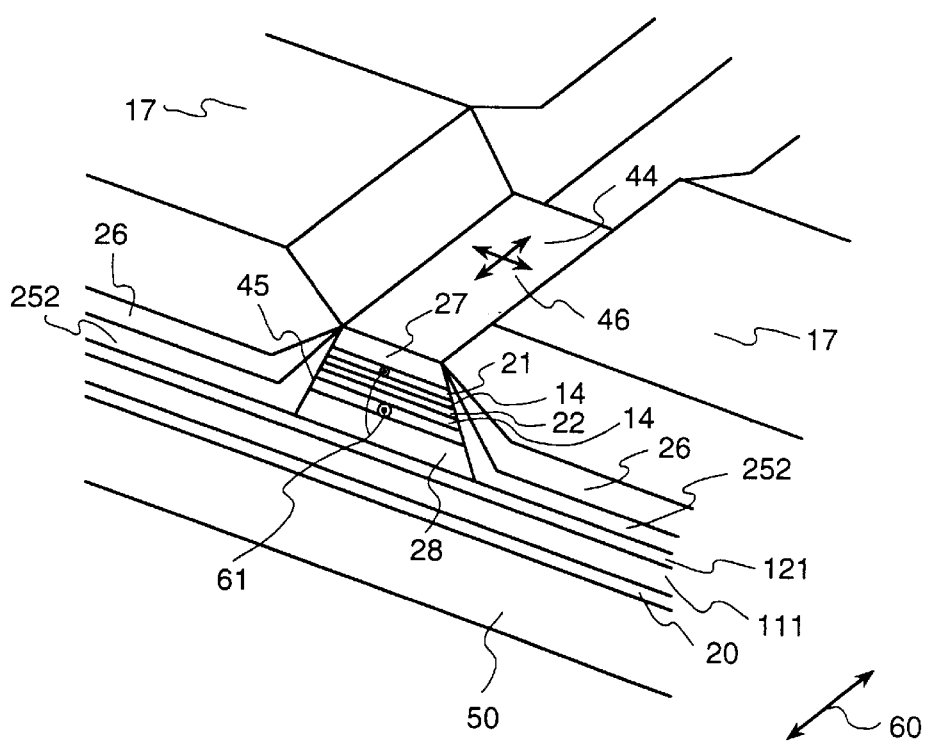
FIG. 20 is a perspective view of a magnetoresistive head in the vicinity of its magnetization sense area of still another embodiment of the invention.

FIG. 20 is a perspective view of a magnetoresistive effect type head of further embodiment 11 of the invention.

Bias films 27 and 28 composed of an antiferromagnetic material are adapted to apply anisotropy by exchange coupling. A longitudinal bias layer has the same structure as that of embodiment 2. Magnetic film 22 separated by non-magnetic conductive film 14 from magnetic film 21 has an easy magnetization direction impressed by an induced uniaxial anisotropy. This is achieved by applying a magnetic field in a predetermined direction to this magnetic film during its deposition. This embodiment 11 of the invention is one example in which application of anisotropies is realized by the bias film and by the induced magnetization anisotropy, the directions of which are perpendicular from each other within the film plane. By causing anisotropy in magnetic film 21 to become large and anisotropy in magnetic film 22 to become small in comparison with a magnitude of magnetic field to be sensed, it becomes possible to substantially fix magnetization in magnetic film 21 relative to an external magnetic field, and allow magnetization in magnetic film 22 alone to respond at a high sensitivity to the external magnetic field. Further, with respect to a magnetic field applied in the directions of arrow 60 and to be sensed, magnetization in magnetic film 21 is caused by anisotropy 61 to be set in an easy axis magnetization state in which its magnetization and the external magnetic field are parallel, while on contrary, it is caused by the anisotropy of magnetic film 22 to be set in a difficult axis magnetization state in which its magnetization and the external magnetic field are perpendicular from each other. By this effect, the above-mentioned high sensitivity response can be further enhanced, and since there exists such a condition in magnetic film 22 under the external magnetic field that the element is driven by the difficult axis magnetization due to rotation, Barkhausen noise associated with magnetization involving movement of magnetic domain walls can be prevented, and operation at high frequencies can be implemented.

Films which constitute the magnetoresistive effect element of the invention are manufactured using high frequency magnetron sputtering equipment as will be described in the following. The following materials are laminated sequentially by deposition on a ceramic substrate and a single crystal silicon substrate to a thickness of 1 mm and a diameter of 3 in under argon environment at 3 milli torr. Nickel oxide, cobalt, Ni-20 at % Fe alloy, Cu are used as sputtering targets. For addition of Co to Ni—Fe alloy, a Co chip was disposed above Ni-20 at % Fe alloy. Also, for addition of Ni and Fe to Co, a Ni chip and Fe chip were disposed over Co target. Each laminated film is formed in a chamber in which each cathode having each target disposed thereon is applied a high frequency power to generate a plasma, then each shutter provided for each cathode is opened one by one to form each film. During film formation, using two pairs of electromagnets which are orthogonal in the plane of the substrate, a magnetic field of approximately 50 Oe is applied in a direction parallel to the substrate so as to provide a uniaxial anisotropy, and a direction of exchange coupling bias of the nickel oxide film is induced to each direction.

Inducing of anisotropy is carried out by applying magnetic fields in the direction of induction at the time of formation of each magnetic film using two pairs of electromagnets provided in the vicinity of the substrate. Alternatively, by heat treatment under application of magnetic field at Neel temperatures of an antiferromagnetic film after formation of a multi-layered film, the direction of antiferromagnetic bias is induced in the direction of the magnetic field.

The performance of the magnetoresistive effect element is evaluated by patterning its film into rectangular strips and forming electrodes thereon. At this time, a direction of uniaxial anisotropy of the magnetic film is adapted to become parallel to the direction of a current which flows through the element. A predetermined current is caused to flow between electrode terminals, and a magnetic field is applied in the plane of the element in a direction perpendicular to the direction of the current. Then, an electrical resistance of the element is measured as a voltage across the electrode terminals, and is sensed as a rate of magnetoresistive change.

A specimen No.1 in Table 1 depicts a rate of resistance change under magnetic fields in an element having upper and lower NiO films. This corresponds to a case where NiO films are used as bias film 27 and 28, $Ni_{80}Fe_{20}$ alloy thin film as magnetic thin films 21 and 22, and a Cu film as a non-magnetic conductive film. The effect of the magnetic film the magnetization in which is strongly induced in the direction of magnetic field is detected as a half portion on the left side of a hysteresis loop. The other effect of the magnetic film the magnetization in which is not strongly induced as above appears as a sharp change of resistance in the center portion thereof. Since a reproducing output of the magnetoresistive effect element of the invention corresponds to a largeness of this resistance change rate, and a sensitivity thereof corresponds to a smallness of its saturation magnetic field respectively, it is clearly understood that the element of the invention has a large output and an improved sensitivity.

Substantially the same effect has been realized with non-magnetic conductive film specimens of Cu with addition of Ag, Au, or with specimens having multilayered films of Ag, Au.

A magnetic coupling strength in NiO/NiFe/Cu/NiFe films in which the thickness of Cu is varied oscillates between antiferromagnetism and ferromagnetism at a cycle of approximately 10 Å of changing thickness of Cu. Thereby, it is essential substantially to nullify this magnetic coupling in order to obtain a magnetoresistive effect element featuring a high sensitivity to a magnetic field. When copper is used as the non-magnetic conductive film, a thickness of which in a range from 11 Å to 22 Å will effectively nullify the magnetic coupling between the magnetic films. Only through such arrangement of the invention described above, it can provide an excellent magnetoresistive effect element which varies its electrical resistance greatly responsive to a weak external magnetic field of several oersted, thereby at a high sensitivity.

When Co is added to NiFe magnetic film, its resistance change rate improves by about 4 to 5.5% from that of NiFe alone. This fact reveals that addition of Co to NiFe contributes to improvement of the magnetoresistive effect in the lamination film.

Table 1 shows examples of magnetic properties of magnetoresistive effect elements fabricated by changing their magnetoresistive effect film structures. A left side composition of each lamination structure is abutting its substrate, and other compositions toward the right side are laminated sequentially one by one.

TABLE 1

| SPECI-MENS | FILM STRUCTURE/THICKNESS (Å) | RESISTANCE CHANGE RATE (%) | SATURATION MAG. FIELD | GRADING |
|---|---|---|---|---|
| No. 1 | NiO/NiFe/Cu/NiFe/Cu/NiFe/NiO 300/60/21/40/21/60/300 | 6.5 | 12 | ⊚ |
| 2 | NiO/Co/Cu/NiFe/Cu/Co/NiO 300/50/21/40/21/50/300 | 7.5 | 13 | ⊚ |
| 3 | NiO/NiFe/Cu/NiFe/Cu/NiFe/Cu/NiFe/NiO 300/60/21/40/21/40/21/60/300 | 5.5 | 11 | ⊚ |
| 4 | NiO/Co/Cu/Co/NiFe/Co/Cu/Co/NiO 300/60/21/15/40/15/21/60/300 | 7.5 | 16 | ⊚ |
| 5 | NiO/NiFe/Cu/NiFe 300/60/21/40 | 4.5 | 15 | ○ |
| 6 | NiO/NiFe/Co/Cu/Co/NiFe 300/60/15/21/15/40 | 5.5 | 14 | ⊚ |
| 7 | NiO/NiFe/Co/Cu/NiFe/Cu/Co/NiFe/NiO 300/60/15/21/40/21/15/60/300 | 7.9 | 14 | ⊚ |

In Table 1, characteristics of each element are represented by electrical resistance change rate and saturation magnetic field. A reproduction output of each element corresponds to a largeness of its electrical resistance change rate, and a sensitivity of each element corresponds to a smallness of its saturation magnetic field, respectively. As clearly understood from Table 1, magnetoresistive elements from Nos. 1 to 5 of the invention have resistance change rates of more than 4% and improved magnetic properties, superior to conventional lamination layers of Nos 6 and 7 in the resistance change rates. In particular, specimens Nos. 1, 2 and 4 indicated an improved magnetic sensitivity of approximately 10 oersted of saturation magnetic field, and an improved output of 6 to 7% of resistance change rates.

Embodiment 12

Figure 21:
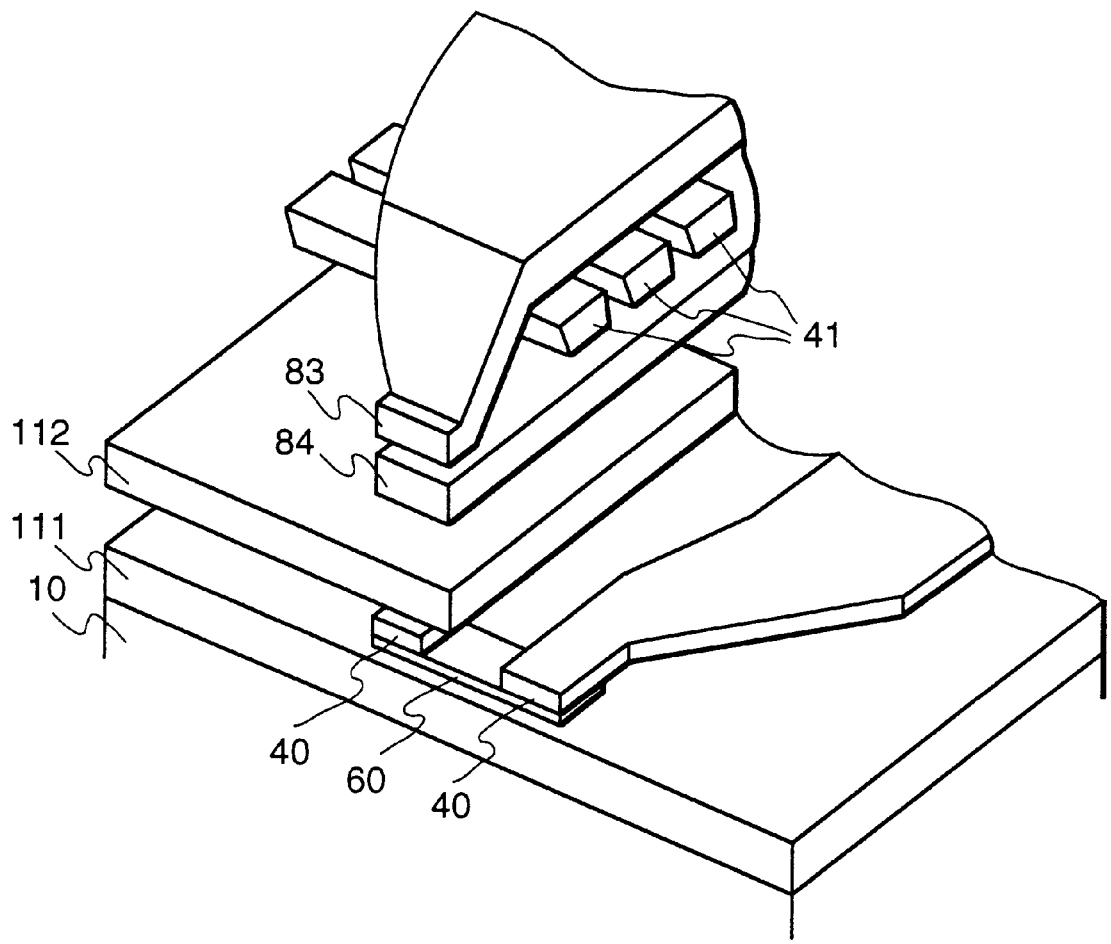
FIG. 21 is a perspective view of a thin film magnetic head including a reproducing magnetoresistive head and a recording inductive type magnetic head according to an embodiment of the invention.

FIG. 21 is a schematic diagram in perspective of a separate type of a recording and reproducing head using the above-mentioned elements. This recording and reproducing separate type head is comprised of a reproducing head which utilizes an element of the invention, an inductive type recording head and a shield member for preventing interference to the reproducing head due to leakage flux. In this drawing of FIG. 21, the recording and reproducing separate type head is shown as a combination with a horizontal magnetic recording head, but it is not limited thereto, and a modified combination with a vertical magnetic recording head for vertical recording should be construed within the scope of the invention. This head comprises a reproducing head having lower shield layer 111 provided on substrate 50, magnetoresistive effect element 60, electrode 40 and upper shield layer 112, and a recording head having lower magnetic film 84, coil 41 and upper magnetic film 83. Thereby, this combined head write a data signal in a recording medium, and reads the data signal from the recording medium. By providing a sense area of the reproducing head and a magnetic gap of the recording head parallel and slidably overlapping each other over the same slider, a simultaneous positioning of both the heads over the same track can be accomplished. This combined head was machined slidably and mounted on the magnetic disk apparatus of the invention.

Magnetoresistive effect element 60 and electrode 40 formed on a substrate which serves as a head slider are slidably positioned over the recording medium to reproduce data therefrom. While the recording medium rotates, the head slider counterposed over the recording medium at a distance less than 0.2 µm or substantially in contact carries out a relative movement with respect to the recording medium. In this arrangement, the magnetoresistive effect element 60 is moved to a designated position where it reads out a magnetic signal stored in the recording medium through a leakage magnetic field therefrom. Magnetoresistive effect element 60 comprises a plurality of laminated films having a plurality of magnetic films and at least one non-magnetic conductive film interposed therebetween, and a bias film, in particular, of an antiferromagnetic film. The feature of the invention resides in that at least one of said plurality of magnetic films in lamination separated by the non-magnetic film is magnetized to have a strong anisotropy induced in the direction of arrow 61 as indicated in FIG. 20 so as to substantially fix its magnetization in this anisotropic direction. The other magnetic films are applied a relatively weak anisotropy in the direction perpendicular to arrow 61 within its film plane so as to induce its magnetization in this direction. Through this arrangement described above, a stored signal which is magnetically stored in the recording medium is caused to reach the magnetoresistive effect element as a leakage magnetic field, and which causes magnetization within the magnetoresistive film to rotate in accordance with each anisotropy such that an angle of direction of intraplane magnetization formed between two magnetic films abutting each other via the non-magnetic conductive film changes to produce a magnetoresistive effect, on the basis of which a reproduction output is obtained. A sensing area of the magnetoresistive effect element for sensing a signal is defined as a portion where a current flows in magnetoresistive effect element 60 between electrodes 40, the width of which in a direction parallel to the surface of the recording medium is narrower than the width of the record track, in particular, with a ratio less than 0.8 therebetween, so as to prevent interference from abutting tracks due to misalignment.

Embodiment 13

Figure 22:
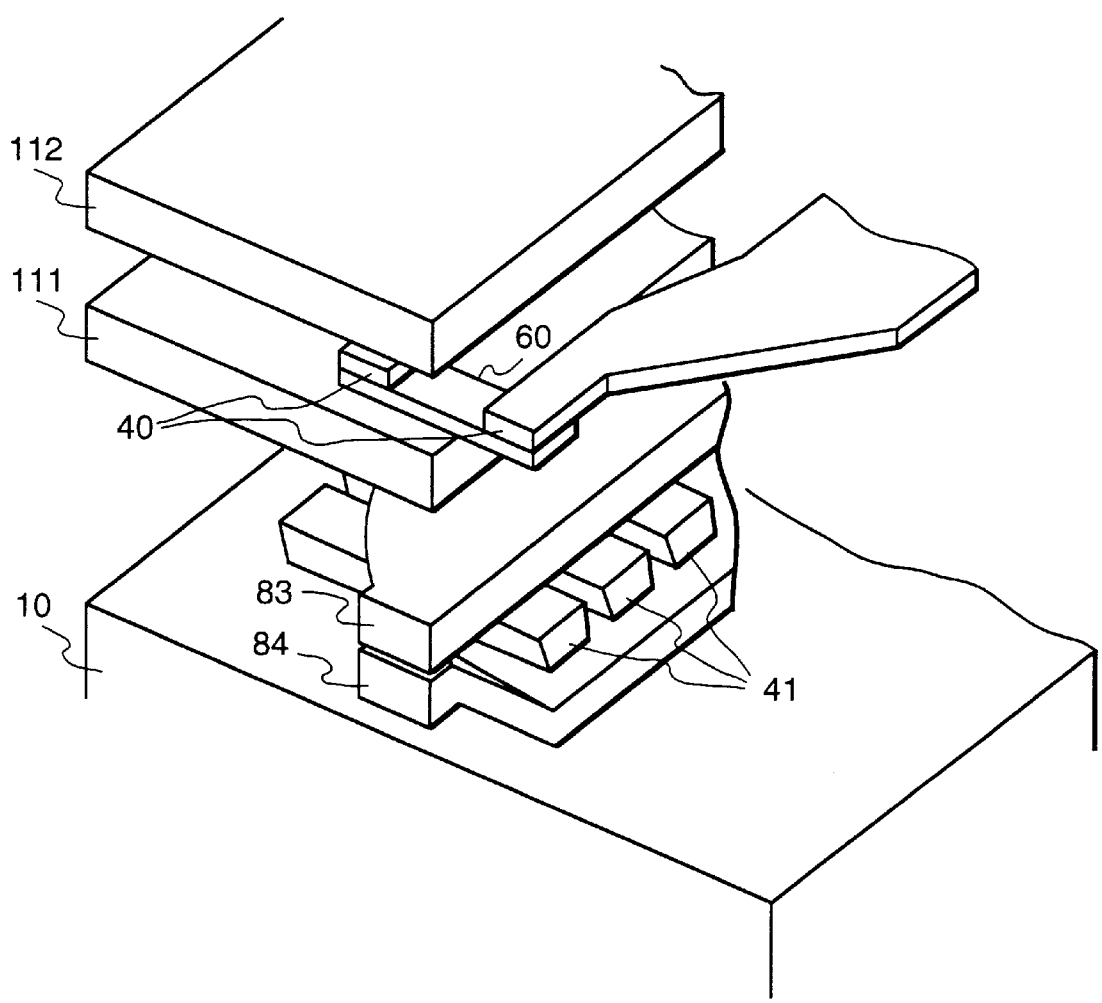
FIG. 22 is a perspective view of a thin film magnetic head including a reproducing magnetoresistive head and a recording inductive type magnetic head according to another embodiment of the invention.

FIG. 22 illustrates another magnetic disk apparatus having a different arrangement of a thin film magnetic head according to another embodiment 13 of the invention. This equipment comprises a recording head which has lower and upper magnetic films 83 and 84 formed on a substrate, coils 41 for applying a magnetomotive force thereto, lower shield layer 111, and a reproducing head having magnetoresistive effect element 60 and electrode 40 which are formed between lower shield layer 111 and upper shield layer 112 afterward the formation of the recording head. Namely, the magnetoresistive film which is relatively susceptible to any change in structural arrangement is formed over the recording head afterward its formation so as to eliminate stress concentration and adverse effect of heat treatment associated with manufacture of the recording head, further to facilitate position alignment with the recording head, thereby improve precision in the track width direction as well as productivity of the magnetic disk apparatus.

The following advantages and results as summarized below have been accomplished according to the invention. Through the provision of the longitudinal bias layer which is provided in order to suppress Barkhausen noise in the magnetoresistive head utilizing the anisotropic magnetoresistive effect and macromagnetoresistive effect, and which has a underlayer made of a ferromagnetic thin film or an antiferromagnetic thin film, each having a crystal structure of a body-centered cubic lattice, or an amorphous ferromagnetic thin film, and a hard magnetic thin film formed on the underlayer, there can be advantageously suppressed a decrease in coercive force even if the longitudinal bias layer is formed on the magnetic thin films such as the magnetoresistive film, bias film and the like having the face-centered cubic lattice crystal structure. In addition, due to the magnetic exchange coupling present between the magnetoresistive film or the bias film and the hard magnetic thin film, magnetization in these thin films is stabilized, thereby providing an excellent magnetoresistive type head free from Barkhausen noise.

Further, through the provision of the hard magnetic film on the side portions of the magnetoresistive effect element abutting thereto according to the invention, its electromagnetic conversion characteristics can be stabilized thereby minimizing Barkhausen noise as well as oscillation variations. Moreover, improved magnetic disk apparatus having an improved reproducing output and high recording density can be provided.

What is claimed is:

1. A magnetoresistive head having a magnetoresistive film for converting a magnetic signal to an electric signal utilizing a magnetoresistive effect, a pair of electrodes for supplying a signal detection current to said magnetoresistive film, and a longitudinal bias layer which applies a longitudinal bias field to said magnetoresistive film, wherein said longitudinal bias layer comprises:

an underlayer composed of one of a ferromagnetic thin film having a crystal structure of a body-centered cell and an antiferromagnetic thin film having a crystal structure of a body-centered cell; and a hard magnetic thin film which is formed on said underlayer.

2. A magnetoresistive head as claimed in claim 1, wherein said underlayer is composed of said ferromagnetic thin film which is a ferromagnetic thin film having a crystal structure of body-centered cubic lattice.

3. A magnetoresistive head as claimed in claim 1, wherein said underlayer is composed of said antiferromagnetic thin film which is an antiferromagnetic thin film having a crystal structure of a body-centered cubic lattice.

4. A magnetoresistive head as claimed in one of claims 1, 2 and 3, wherein said magnetoresistive film comprises a ferromagnetic layer which exhibits an anisotropic magnetoresistive effect, and a transverse biasing method which applies a transverse bias field to said magnetoresistive film.

5. A magnetoresistive head as claimed in one of claims 1, 2 and 3, wherein said magnetoresistive film comprises a multi-layered film which includes a first magnetic thin film, an intermediate layer of a non-magnetic conductive thin film and a second magnetic thin film, wherein a direction of magnetization in said first magnetic thin film is fixed by the exchange interaction between said first magnetic thin film and an antiferromagnetic layer which is formed adjacent to said first magnetic thin film, and a direction of magnetization in said second magnetic thin film is substantially perpendicular to the direction of magnetization in said first magnetic thin film in absence of an external magnetic field, and wherein an electrical resistance of said magnetoresistive film changes according to a change of a relative angle between directions of magnetization in said first magnetic thin film and said second magnetic thin film.

6. The magnetoresistive head as claimed in one of claims 1 and 2, wherein said ferromagnetic thin film having said crystal structure of a body-centered cubic cell is Fe, Fe—Ni alloy, Fe—Co alloy or Fe—Ni—Co alloy.

7. The magnetoresistive head as claimed in one of claims 1 and 2, wherein said ferromagnetic thin film having said crystal structure of a body-centered cubic cell comprises at least one of Fe, Fe—Ni alloy, Fe—Co alloy or Fe—Ni—Co alloy, and an addition of $M_3$ where $M_3$ is at least one element selected from the group of Si, V, Cr, Nb, Mo, Ta and W.

8. The magnetoresistive head as claimed in claim 7, wherein said ferromagnetic thin film having said body-centered cubic cell crystal structure is an alloy having Fe and Cr as main components.

9. The magnetoresistive head as claimed in claim 8 wherein said alloy including Fe and Cr as main components has Cr from 5 to 45 atomic percentage.

10. The magnetoresistive head as claimed in one of claims 1 and 3, wherein said underlayer having said antiferromagnetic thin film is an alloy including as main components Cr, Mn and $M_5$ where $M_5$ is at least one element selected from the group of Cu, Au, Ag, Co, Ni, Ru, Rh, Pd, Re, Os, Ir and Pt.

11. The magnetoresistive head as claimed in claim 1, wherein said underlayer produces an exchange coupling between said magnetoresistive film and said hard magnetic thin film.

12. The magnetoresistive head as claimed in claim 1, wherein said underlayer and said hard magnetic layer are formed in direct contact with one another and in contact with said magnetoresistive film.

13. A magnetoresistive head having a magnetoresistive film, the electrical resistance of which changes in response to a magnetic field, a transverse bias layer exhibiting a soft magnetic property which impresses a transverse bias field to said magnetoresistive film, a spacer film made of a non-magnetic material which magnetically separates said transverse bias layer and said magnetoresistive film, a longitudinal bias layer which is disposed abutting both sides of a laminated film composed of said magnetoresistive film, said transverse bias layer and said spacer film, and which applies a longitudinal bias field to said magnetoresistive film, and a pair of electrodes which supply a current to said magnetoresistive film, wherein said longitudinal bias layer comprises:

an underlayer which is made of one of a ferromagnetic thin film, antiferromagnetic thin film and amorphous ferromagnetic thin film; and a hard magnetic film which is formed on said underlayer, and wherein said transverse bias layer which applies the transverse bias field to said magnetoresistive film comprises:

at least one of Ni—Fe alloy, Co, Ni—Fe—Co alloy; and at least one of compounds selected from the group of zirconium oxide, aluminum oxide, hafnium oxide, titanium oxide, beryllium oxide, magnesium oxide, tantalum oxide, rare-earth oxide compound, zirconium nitride, hafnium nitride, alumininum nitride, and rare earth nitride compound.

14. The magnetoresistive head as claimed in claim 13, wherein said transverse bias layer which applies the transverse bias field to said magnetoresistive film has a resistivity of 70 $\mu\Omega$cm or more.

15. The magnetoresistive head as claimed in claim 14, wherein said transverse bias layer is a Ni—Fe alloy including nickel from 78 to 84 atomic percentage.

16. A magnetoresistive head as claimed in claim 13, wherein each of said ferromagnetic thin film and said antiferromagnetic thin film have a crystal structure of a body-centered cell.

17. A magnetoresistive head as claimed in claim 16, wherein each of said ferromagnetic thin film and said antiferromagnetic thin film of said underlayer have a crystal structure of a body-centered cubic lattice.

18. A magnetic disk apparatus having a magnetic recording medium for recording information, a magnetic head for reading and writing said information, said head having a magnetoresistive element having a longitudinal bias layer provided by forming a hard magnetic thin film on an underlayer made of one of a ferromagnetic thin film having a crystal structure of a body-centered cell and an antiferromagnetic thin film having a crystal structure of a body-centered cell, an actuator for moving said magnetic head to a position designated on said magnetic recording medium, and a controller for controlling transmission and reception of said information during reading and writing using said magnetic head and for controlling movement of said actuator.

19. A magnetoresistive head as claimed in claim 18, wherein each of said ferromagnetic thin film and said antiferromagnetic thin film have a crystal structure of a body-centered cubic lattice.

20. The magnetic disk apparatus as claimed in claim 18, wherein said underlayer produces an exchange coupling between said magnetoresistive film and said hard magnetic thin film.

21. The magnetic disk apparatus as claimed in claim 18, wherein said underlayer and said hard magnetic layer are formed in direct contact with one another and in contact with said magnetoresistive film.

\* \* \* \* \*